United States Patent [19]
Taylor et al.

[11] Patent Number: 6,020,282
[45] Date of Patent: Feb. 1, 2000

[54] SUBSTANTIALLY INERT CLAY PRODUCT AND PROCESS FOR MANUFACTURE

[75] Inventors: Dennis R. Taylor, Chicago, Ill.; Jennifer A. Stein, Kenosha, Wis.

[73] Assignee: Oil-Dri Corporation of America, Chicago, Ill.

[21] Appl. No.: 08/925,539

[22] Filed: Sep. 8, 1997

[51] Int. Cl.⁷ .................................................. B01J 21/16
[52] U.S. Cl. ................................ 502/84; 502/80; 502/85
[58] Field of Search .................................. 502/80, 84, 85

[56] References Cited

U.S. PATENT DOCUMENTS

| | | | |
|---|---|---|---|
| 3,273,040 | 9/1966 | Schuster | 321/2 |
| 4,440,867 | 4/1984 | Sabherwal | 502/62 |
| 4,968,651 | 11/1990 | Crabtree | 502/63 |
| 5,413,978 | 5/1995 | Kramer | 502/80 |

FOREIGN PATENT DOCUMENTS

| | | |
|---|---|---|
| 52-56093 | 5/1977 | Japan . |
| 56-93842 | 7/1981 | Japan . |

*Primary Examiner*—Thomas Dunn
*Attorney, Agent, or Firm*—Olson & Hierl, Ltd.

[57] ABSTRACT

A substantially dust-free, inert absorbent derived from clay is described. Raw clay having strong surface acidity sites is combined with a metal salt, then heat treated to produce vitrified clay granules suitable as a carrier for labile chemical or biological materials.

39 Claims, 19 Drawing Sheets

SUBSTANTIALLY INERT CLAY PRODUCT AND PROCESS FOR MANUFACTURE

FIELD OF THE INVENTION

This invention relates to a substantially inert and dust-free clay product suitable as a carrier for labile materials and to a method of manufacturing such a commodity. In particular, the present invention is directed to a fluxation process of clay to produce a durable, cost-effective product.

BACKGROUND OF THE INVENTION

Clay is a sorptive mineral characterized by a layered lattice crystal structure. Clay minerals are derived from condensed forms of silicic acid, $H_4SiO_4$, where each silicon atom is surrounded by four oxygen atoms in a tetrahedral structure. These silicate tetrahedra are linked together in regular arrays by the sharing of common oxygen atoms to form chains or two-dimensional sheets and layers.

Metal hydroxides, notably those of magnesium, aluminum, and iron, may also condense to form two-dimensional octahedral structures which can be interdispersed with the above silicate lattices. Various degrees of mismatch and distortion between the tetrahedral and octahedral layers can occur, conferring diverse morphological and chemical properties to the clay. Other factors which influence the character of the clay are the geographical location of the site, and the unique combinations of metals therein.

In the crystalline lattice, the irregular series of layers with corresponding interstitial spaces comprise pores which avail the clay mineral to adsorption phenomena. The metal ions bound within the lattices may also play a role in the solvation or hydration of clay in light of the mechanisms of ion exchange and hydrogen bonding. Osmosis can be a factor in adsorption as well. Polarized water molecules adsorbed onto the surface of mineral clays present an important property of many clays, namely their surface acidity. In fact, the surface acidity of dried mineral clays may exceed that of concentrated sulfuric acid. This can result in the catalysis of many reactions, desirable or otherwise.

Pesticides, including many insecticides, fungicides, nematocides, and herbicides, are often prepared as dry formulations that contain the pesticide impregnated onto various organic and inorganic carriers in their granulated or powdered forms. Collectively, these pesticides are often referred to as "active ingredients" and are represented by such diverse chemical classes as organophosphate esters, carbamates, pyrethroids, polyhalogenated hydrocarbons, or the like. Examples of organic carriers are corn cob grit, peanut hulls, and pecan hulls. Examples of inorganic carriers are clay minerals such as montmorillonite, attapulgite, sepiolite, vermiculite, kaolinite and various other mineral ores, e.g., gypsum, diatomaceous earth, and the like. Sand can be employed as a carrier in certain circumstances. The decision to employ a preparation composed of such pesticide/carrier mixtures is dictated by the safety, efficacy, ease of application, and nature of the target.

Generally speaking, it is desirable that carrier materials used for granular pesticide preparations possess sufficient hardness such that the formulated granules are not easily reduced to powders and possess enough porosity so that high loadings of the active ingredient can be achieved. Hardness is particularly important from the standpoint of worker exposure. If the formulated granules can be easily reduced to fine powder/dust by handling, the dust can become airborne and inhaled by workers. Porosity or "liquid holding capacity" (LHC) of the granular material refers to the ability to retain pesticides internally, thereby keeping the surface of the granule dry. It is desirable that granules have high LHC, which reduced the total mass of preparation that needs to be applied and thereby increases per pound efficacy.

Another important property of granular products destined for use as carriers for pesticides is inertness. Inertness refers to the lack of chemical reactivity with an active ingredient such as a pesticide. It is well known in the industry that some carriers possess sufficient chemical reactivity that they are capable of degrading or partially decomposing active ingredients.

For example, the common pesticides parathion and malathion are particularly susceptible to hydrolysis when absorbed onto the surface of most aluminosilicate clay minerals [U. Mingelgrin, S. Yariv, and S. Saltzmann, *J. Soil Sci. Amer.*, 42, 519 (1978)]. It has been reported that the exchangeable metal cations in mineral clays are potent catalysts for the hydrolysis of pesticides [M. M. Mortland and K. V. Raman, *J. Agr. Food Chem.*, 15, 163, (1967)]. Other agricultural chemicals which are susceptible to hydrolysis on clay mineral surfaces include the chlorotriazine herbicides as well as the chlorinated aromatic and alicyclic pesticides.

From the standpoint of the formulator using granular carriers, pesticide stability is of concern for both regulatory and economic reasons. Pesticide preparations used as items of commerce are carefully monitored by both state and federal agencies which regulate the level of the active ingredient claimed on the label plus allowed variance. The formulator may be required to pay substantial fines and/or remove the product from the marketplace if the product is in violation of the regulation. With regard to economics, since the pesticide is the active ingredient, any loss of its activity due to degradation reduces efficacy, thereby making the product less competitive or cost effective in the marketplace. Also, since the active ingredient is the most expensive ingredient in these preparations, the formulator desires to use the smallest amount of pesticide while still meeting the primary objective of preparing an efficacious product. If "extra" pesticide in the preparation is required to make up for degradation losses due to lack granule inertness, this adds cost and again makes the product less competitive in the marketplace.

Pesticide formulators are well aware of the pesticide stability issue and there are numerous patents which claim solutions to this problem. The most common approach involves using an additional ingredient in the preparation to moderate or reduce the chemical activity of the carrier toward the active ingredient. Sometimes called "deactivators", these ingredients are generally organic molecules such as organic amines, lactones, organic acids, glycols, alcohols, and trialkylphosphates which can be used alone or in combination. Usually they are used at levels in the 1–4 wt. % range, but sometimes higher levels are required. Although such deactivators generally cost from $0.60–$1.83 per pound and can add from $50–$75/ton to the cost of finished goods, the added expense is justified by having an active product.

It is also understood that some types of clays, particularly attapulgite, can be made more stable (i.e.—less chemically reactive) simply by heating at elevated temperatures. For example, heating either kaolin or attapulgite to 1000° C. (1832° F.) reduces the surface area of the carrier [B. Valange, J. Marcoen, J. Closset, *Parasitica*, 31, 135 (1975).] Heat-treated carriers exhibit a decreased tendency to degrade the pesticide malathion. U.S. Pat. No. 3,232,831 to Schwin describes thermal treatment in the range 1500–2000° F. of attapulgite, such that the surface area of the clay is reduced to below 20 m²/gm. Such a carrier is highly stable for the organophosphate ester Diazinon™. U.S. Pat. No. 3,278,040 to Goldberg et. al. describes a method of making better filter aids consisting of fluxing attapulgite with various salts including lime and feldspar with sodium or calcium carbonates.

While high temperature thermal processing is simple, there are negative performance and economic consequences associated with such an approach. In particular, the extra fuel required to achieve such high temperatures substantially increases the cost of finished goods on a per ton basis. Furthermore, the liquid holding capacity of attapulgite clay is substantially reduced when subjected to high temperature thermal processing, thus limiting the amount of active ingredient which may be added.

The present invention describes a fluxation process for manufacturing clay-based materials that exhibit substantially improved stability characteristics as carriers for labile or sensitive pesticides. In addition, such improved carriers require less organic deactivator to be used for stabilization. The present process of fluxation includes heating salt-impregnated precursor clays under conditions sufficient to obtain clay-based products possessing enhanced inertness and thus enhanced product stability.

SUMMARY OF THE INVENTION

A substantially inert and dust-free absorbent clay product suitable as a carrier for agricultural chemicals and a method for manufacture thereof are disclosed. In production, a vitrifiable clay is combined with a vitrifying agent which is a metal salt whose anion is a member of the group consisting of a monoatomic anion, an oxygen-containing polyanion, and mixtures thereof, to form a metal salt impregnated clay. The impregnated clay so produced is then heated to a temperature in the range of about 800° F. to about 1500° F., held at such temperature for a period of time sufficient to vitrify at least some of the clay, and then cooled. A hardened granular product, a fluxated product, is obtained which is useful as a dust-free, cost-effective, substantially inert chemical carrier or absorbent.

BRIEF DESCRIPTIONS OF THE DRAWINGS

DETAILED DESCRIPTION OF PREFERRED EMBODIMENTS

Figure 1:
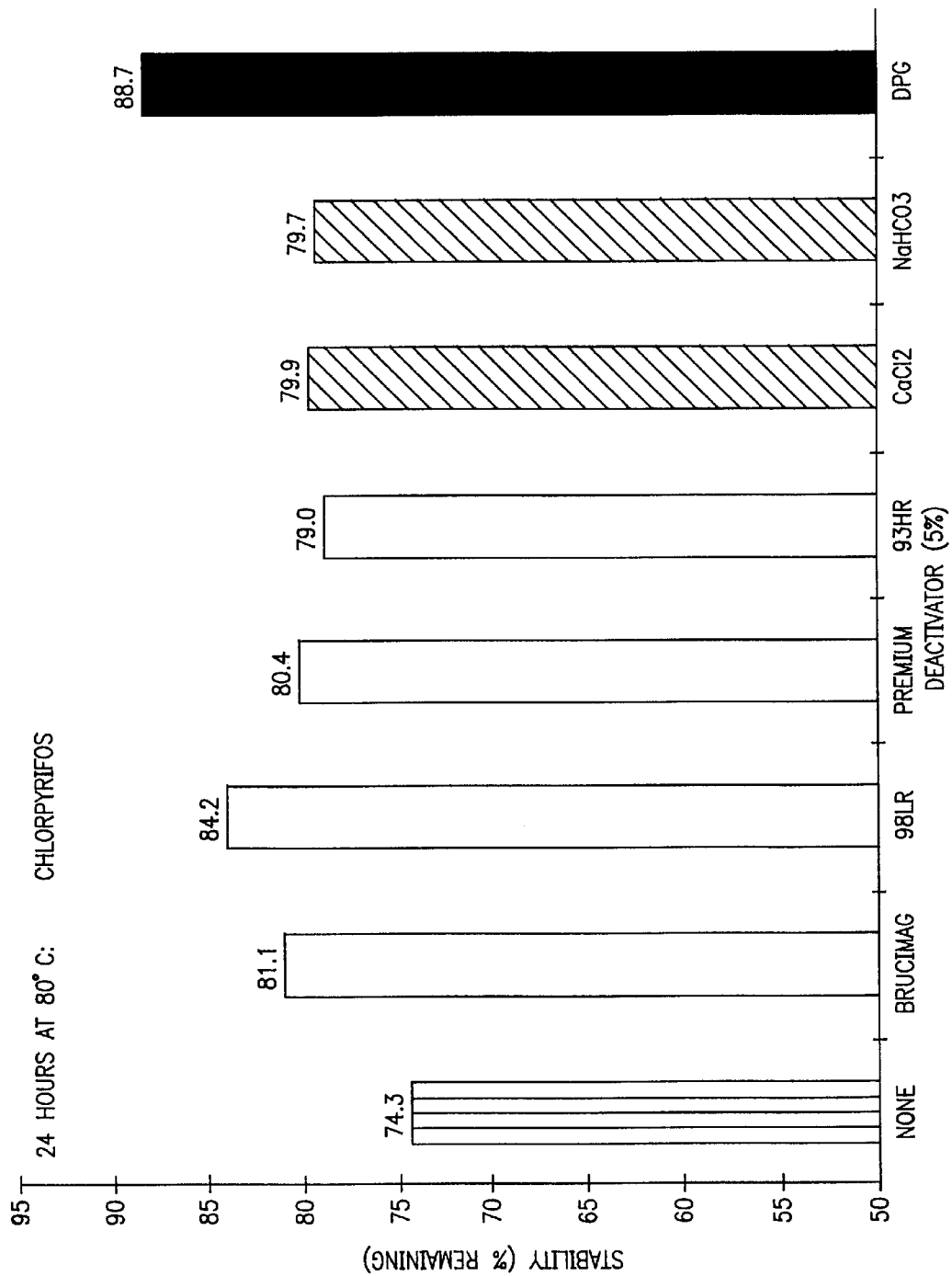
FIG. 1 is a histogram illustrating the accelerated stability results for Dursban™ on reconstituted Georgia clay fines containing 5% by wt. inorganic salt (magnesium oxide, calcium chloride, or sodium bicarbonate).

A substantially inert and dust-free clay product is obtained by the heating of clay in the presence of a vitrifying agent (a metal salt in this case) in which the anion of the metal salt is a member of the group consisting of a monoatomic anion, an oxygen-containing polyanion, and mixtures thereof. The term "fluxation" denotes the process of heating clay in the presence of a vitrifying agent. Using the present fluxation process, the clay product can be prepared at significantly lower temperatures than those described in the prior art, representing an economic benefit. Also, the present clay product exhibits significantly decreased reactivity, so that the product is suitable as a carrier for labile chemicals or biological materials. Such an improved carrier requires less organic deactivator to be used for additional stabilization of labile pesticides.

A vitrifiable raw clay (or fines thereof), preferably having strong surface acidity sites, is combined with a metal salt to form a metal salt impregnated clay. The resulting metal salt impregnated clay is subsequently heated to a temperature in the range of about 800° F. to about 1500° F. to form a hardened, substantially dust-free, particulate, vitrified clay product. It is believed that the uniform distribution of the inorganic cation derived from the present method of impregnation using a solution of metal salt in water decreases the reactivity of the clay product. This represents a significant process improvement and enhances the safe handling of the hardened clay product. In addition, the reactivity of the clay product has been significantly decreased by this process, thereby allowing the application of labile chemical compounds or biological materials to a fluxated clay product that serves as a carrier therefor. If desired, the hardened clay product can be further treated with an organic deactivator such as dipropylene glycol (DPG) or the like.

Suitable starting materials are those clays that are vitrifiable and preferably exhibit a relatively high surface acidity, above about 0.02 milliequivalents of n-butylamine per gram, due to the presence of surface acidity sites having a pKa of about 1.5. Also suitable are vitrifiable clays that have a relatively high surface area, i.e., at least about 60 m$^2$/gram, even though strong surface acidity sites are absent. Illustrative of such vitrifiable clays is sepiolite. Depending on additional factors, the raw clay can be from either the hormite mineral group (a hormite clay), the kaolinite mineral group (a kaolinite clay), or the smectite mineral group (a smectite clay). The hormite group of minerals includes the palygorskite and sepiolite varieties which have silicate ring, ribbon, or chain structures. The kaolinite group includes kaolin, halloysite, and dickite. The smectite mineral group includes the montmorillonite, vermiculite, nontronite, hectorite, and saponite varieties. Other minerals which are neither hormite, kaolinite, nor smectite which may be present in the raw clay are opal, apatite, calcite, feldspar, mica, quartz, and gypsum among others.

The metal salt that serves as a vitrifying agent can be supplied as a solid particulate or, more preferably, in the form of an aqueous solution. Preferably, the metal salt is an alkali metal salt or an alkaline earth metal salt. The preferred alkali metal salt is selected from the group consisting of sodium carbonate, sodium bicarbonate, sodium chloride, lithium chloride, potassium carbonate, potassium chloride, sodium orthosilicate, and sodium metasilicate. More preferably, the alkali metal salt is sodium carbonate. The preferred alkaline earth metal salt is a member of the group consisting of calcium formate, calcium chloride, and magnesium chloride. Also, it is preferable that the metal salt is thermally decomposable.

The solid particulate metal salt is applied to the clay at a level of about 3% to about 7% by weight, based on the dry weight of the clay, more preferably about 5% by weight. When using an aqueous solution of the metal salt, the metal salt content of the solution is in the range of about 10% to about 30% by weight of the salt in water. More preferably the metal salt content of the solution is about 20% by weight. The aqueous solution of the metal salt is applied to the clay at a level in the range of about 3% to about 7% by weight, based on the dry weight of the clay. Preferably, the metal salt solution is applied at a level of about 5% by weight.

The metal salt impregnated clay can be heated in a muffle furnace or preferably in a rotary kiln to a temperature in the range of about 800° F. to about 1500° F. This temperature is maintained for a time period sufficient to vitrify at least some of the clay. The metal salt and the clay preferably are thoroughly mixed prior to heating and agitated during heating. A preferred temperature range for heating the impregnated clay is about 900° F. to about 1350° F. Heating is continued for a time period preferably in the range of about 20 minutes to about 3 hours. Heating beyond a time period of about 3 hours does not provide any further benefit.

If desired, an organic deactivator can be applied to the vitrified clay. A preferred organic deactivator is dipropylene glycol (DPG). The amount of organic deactivator that can be added is in the range of about 1% to about 4% by weight, based on the dry weight of the clay.

EXAMPLE 1

Manufacture of a Sorbent Clay Product by Fluxation (Mississippi Clay)

About 2893 g of Mississippi (MS) clay (Flo-Fre Mississippi; montmorillonite) clay having a mean particle size of about 24/48 (U.S. Sieve Series) was placed into the stainless steel bowl of a blender. About 175 g (about 5% by weight) of deactivator was added to this particulate clay. The various deactivators used are listed in TABLE 1, below. About 432 g of water mist was added to the clay and deactivator mixture which was vigorously mixed for about 30 minutes. Next, the resulting pasty mixture was screened over a 30 mesh screen (U.S. Sieve Series) to remove large clumps. The mixture was then agglomerated on a roll mill (KOMERAK B-100A 2) with the following settings: hydraulic psi=2750, roll separation force=11.9 tons, roll gap=0.3 inches, roll amps=3, roll settings=8, and feeder amps=3. The agglomerated mixture was fluxated by placing it into a muffle furnace at a temperature of about 1200° F. for about 2 hours. After cooling, the agglomerated clay products were tested for changes in pH, liquid holding capacity (LHC), density, and hardness. The results are presented in TABLE 1, below.

To evaluate the pH of the product, about 5 g of material was weighed into a 250 ml beaker and about 100 ml of deionized water was added. The contents were stirred for about 15 minutes, then the pH of the aqueous mixture was measured with a pH meter standardized by a pH 7 buffer.

The liquid holding capacity of the product was evaluated by placing about 7 g product into a 1 oz. glass jar and adding about 2 ml kerosene, in increments of about 0.5 ml. After the addition of each increment of kerosene, the contents of the jar were agitated until the kerosene was completely adsorbed. The end point was determined by adding increments of kerosene of 0.2 ml until two or more of the following phenomena were observed: granules darken or appear wet, granules cease to be free-flowing, granules stick to the sides of the bottle, or the granules stick to the bottom of the bottle when the bottle is slowly inverted. The liquid holding capacity (wt. %) was calculated by the equation:

$$\% \text{ LHC} = \frac{\text{g kerosene} \times 1.25 \times 100}{[\text{g granules} \times (\text{g kerosene} \times 1.25)]}$$

To determine the density of the fluxated product, about 600 g of product was placed in an Ohaus filling hopper with the bottom gate closed. A tared dry pint cup was placed below the gate. The gate was quickly opened and the material was allowed to fill the cup until it overflowed. The material was leveled in the cup using a straight edge. The weight of the full cup was determined. The equation for calculating density (e.g., lbs/cu. ft.) based on these measurements is listed below:

$$\text{Density} = (M_{clay+tare} - M_{tare}) \times 0.113$$

where M is the weight.

The hardness of the granules was measured by the following technique. The product was screened to about 100% +60 mesh and about 50 g was placed into the pan of a screen stack with ten steel balls (⅝ inch size). The stack was placed in a ROTAP agitator and agitated for about 10 minutes with the hammer in the "up" position. After being agitated, the material was placed on the 60 mesh screen and the steel balls were removed. The 60 mesh screen and contents were returned to the stack and the stack was replaced in the ROTAP agitator. The material was once again agitated for about 10 minutes with the hammer in the "down" position. The 60 mesh screen was removed and the weight of the screen plus product was recorded. The percent hardness was calculated by the following equation:

$$\% \text{ hardness} = 100 \times \frac{[\text{product (g)} + \text{tare (g)}] - \text{tare (g)}}{\text{starting clay (g)}}$$

The results of EXAMPLE 1 (Mississippi clay tests) are discussed in comparison with those of EXAMPLE 2 (Georgia clay tests), below.

TABLE 1

Physical Properties of Reconstituted Mississippi Fines Fluxated at 1200° F.

| Deactivator (5 wt. %) | pH | LHC(%) | Density(lb/ft³) | Hardness(%) |
|---|---|---|---|---|
| Control (none) | 5.8 | 29.0 | 42.1 | 94.0 |
| CaCl₂ | 6.6 | 28.0 | 43.3 | 93.1 |
| NaHCO₂ | 7.5 | 28.0 | 44.6 | 93.7 |
| MgO▲ Premium | 9.5 | 27.0 | 44.9 | 92.1 |
| MgO▲ 98 LR | 9.0 | 26.0 | 44.4 | 92.7 |
| MgO▲ Brucimag S | 9.1 | 29.0 | 42.9 | 92.2 |
| MgO▲ 93 HR | 8.6 | 27.0 | 44.6 | 92.3 |
| Al₂O₃♦ V-250* | 6.1 | 31.0 | 42.3 | 97.3 |
| Al₂O₃♦ V-900* | 6.1 | 29.0 | 41.4 | 96.8 |
| Al₂O₃♦ H-30 | 5.9 | 29.0 | 42.6 | 93.6 |
| Al₂O₃♦ A-300 | 6.0 | 29.0 | 42.3 | 93.0 |
| Al₂O₃♦ V-B | 5.8 | 29.0 | 42.3 | 93.3 |
| Al₂O₃♦ V-250** | 5.8 | 29.0 | 41.2 | 91.1 |
| Al₂O₃♦ V-900** | 6.0 | 29.0 | 40.4 | 91.8 |

*Water was added to the mixture of clay and deactivator.
**Water was added to the deactivator.
▲ Premier Services Corp.
♦ LaRoche Chemicals

EXAMPLE 2

Manufacture of a Sorbent Clay Product by Fluxation (Georgia Clay)

About 2947 g of Georgia (GA) clay (Flo-Fre Georgia; attapulgite/montmorillonite) having a mean particle size of about 24/48 (U.S. Sieve Series) was placed into the stainless steel bowl of a blender. About 175 g (about 5% by weight) of deactivator was added to this clay. The various deactivators used are listed in TABLE 1, above. About 378 g of water mist was added to the clay and deactivator mixture which was then vigorously mixed for about 30 minutes. Next the resulting pasty mixture was screened over a 30 mesh screen (U.S. Standard Series) to remove large clumps. The mixture was then agglomerated on a roll mill (KOMERAK B-100A 2) with the settings: hydraulic psi=2750, roll separation force=11.9 tons, roll gap=0.3 inches, roll amps=3, roll settings=8, and feeder amps=3. The agglomerated mixture was fluxated in a muffle furnace at a temperature of about 900° F. for about 2 hours. After cooling, the agglomerated clay products were tested for changes in pH, liquid holding capacity (LHC), density, and hardness. The results are presented in TABLE 2, below. The physical testing procedures were the same as those described for EXAMPLE 1, above.

TABLE 2

Physical Properties of Reconstituted Georgia Fines Fluxated at 900° F.

| Deactivator (5 wt. %) | pH | LHC(%) | Density(lb/ft³) | Hardness(%) |
|---|---|---|---|---|
| Control (none) | 7.3 | 23 | 45.9 | 79.4 |
| CaCl₂ | 7.9 | 23 | 44.5 | 85.4 |
| NaHCO₂ | 10.3 | 23 | 46.3 | 90.1 |
| MgO▲ Premium | 10.5 | 21 | 45.5 | 86.6 |
| MgO▲ 98 LR | 10.6 | 19 | 48.3 | 85.4 |
| MgO▲ Brucimag | 10.5 | 23 | 48.3 | 89.4 |
| MgO▲ 93 HR | 9.8 | 21 | 49.0 | 87.4 |
| Al₂O₃♦ V-250* | 8.0 | 25 | 45.3 | 88.8 |
| Al₂O₃♦ V-900* | 6.2 | 23 | 44.2 | 86.6 |
| Al₂O₃♦ H-30 | 8.6 | 23 | 46.2 | 84.1 |
| Al₂O₃♦ A-300 | 7.9 | 23 | 45.9 | 82.2 |
| Al₂O₃♦ V-B | 8.0 | 25 | 46.2 | 80.6 |
| Al₂O₃♦ V-250** | 9.0 | 21 | 47.0 | 84.8 |
| Al₂O₃♦ V-900** | 7.4 | 21 | 46.6 | 82.7 |

*Water was added to the mixture of clay and deactivator.
**Water was added to the deactivator.
▲ Premier Services Corp.
♦ LaRoche Chemicals TABLES 1 and 2 report the physicochemical data obtained for the fluxation of reconstituted fines from montmorillonite and attapulgite-montmorillonite clays with the addition of various deactivators at about 5% by weight. The pH values for Mississippi clay increased with the addition of basic metal salts such as sodium bicarbonate ($NaHCO_3$) and magnesium oxide (MgO), and also with the addition of a neutral metal salt, calcium chloride ($CaCl_2$). The addition of weakly hydrated alumina ($Al_2O_3 \cdot 3H_2O$), another basic metal salt, did not significantly affect the pH value of the Mississippi clay. The pH situation was different for the Georgia clay. In this case, the pH values increased upon the addition of the basic additives (sodium bicarbonate, magnesium oxide, and aluminum oxide) as well as by the addition of the neutral additive, calcium chloride. For the Mississippi clay, the liquid holding capacity (LHC) remained consistent after fluxation, with a slight rise in density upon heating. For the Georgia clay, the liquid holding capacity remained steady, and the density was increased by fluxation. The hardness values for Mississippi clay did not significantly change upon heat treatment, though the hardness of the Georgia clay increased slightly.

These results indicate that the fluxation of clay fines at high temperatures did not destroy the desirable properties of the clay but instead somewhat enhanced them. These tests were prerequisite for the following stability assays with various labile organic compounds used in conjunction with the inactivated fluxated clays. For stability testing, the following pesticides were employed: Dursban™ (95.5% chlorpyrifos) and Diazinon™ (87.9% diazinon).

EXAMPLE 3

Stability of Dursban™ on Fluxated Deactivated Clays

Fluxated clay treated with deactivator was dried for about two hours at about 105° C. About 21.07 g of the dried clay was placed into a one pint wide-mouth Mason jar and placed into a 80° C. oven for about 30 minutes. The solid pesticide, Dursban™, was melted by placing a container-full in warm water. The warmed clay, meanwhile, was placed in a horizontal spinner apparatus and was spun at a rate of approximately 90 rpm. About 3.93 g of Dursban™ was misted onto the warmed clay while the clay was spinning. The clay in the jar was agitated to break up any clumps of clay that may be present. The spinning was resumed for five more minutes to evenly distribute the pesticide.

For stability testing, two samples of about 5 g each of the pesticide-treated clay were weighed into 1 oz. Kerr™ jars. About 20 ml of methylene chloride was added to the contents. To extract the pesticide, the jar contents were agitated on an orbital shaker for about 20 min. at about 400 rpm. Afterwards, the jars were centrifuged at about 1000 rpm for about 3 minutes and the separated liquid extracts were decanted.

Negative and positive controls were also prepared. The negative control was prepared as described above, but was without deactivator. The positive control was prepared by treating the already-fluxated negative control with 5% by weight dipropylene glycol (organic deactivator) prior to pesticide addition.

The extracts were analyzed on a Perkin Elmer Sigma 300 Gas Chromatograph equipped with a Supelco SPB-5 silica capillary column. For this analysis, about 1 ml of the extract was placed into a 10 ml volumetric flask and the flask was filled to the mark with a standard solution of 0.24% dibutyl phthalate. About 1 µl of this solution was injected into the GC with the following conditions: $O_2$ pressure=20 psi; $H_2$ pressure=17 psi; He pressure=12 psi; oven temperature= 240° C.; injector and detector temperature=270° C. The conditions for the integrator (Waters 746 Data Module) were: PW=3; CS=0.25; AT=128.

The accelerated stability test results of the pesticide, Dursban™, with clay fines which were fluxated with various deactivators are shown in FIGS. 1–4.

Figure 2:
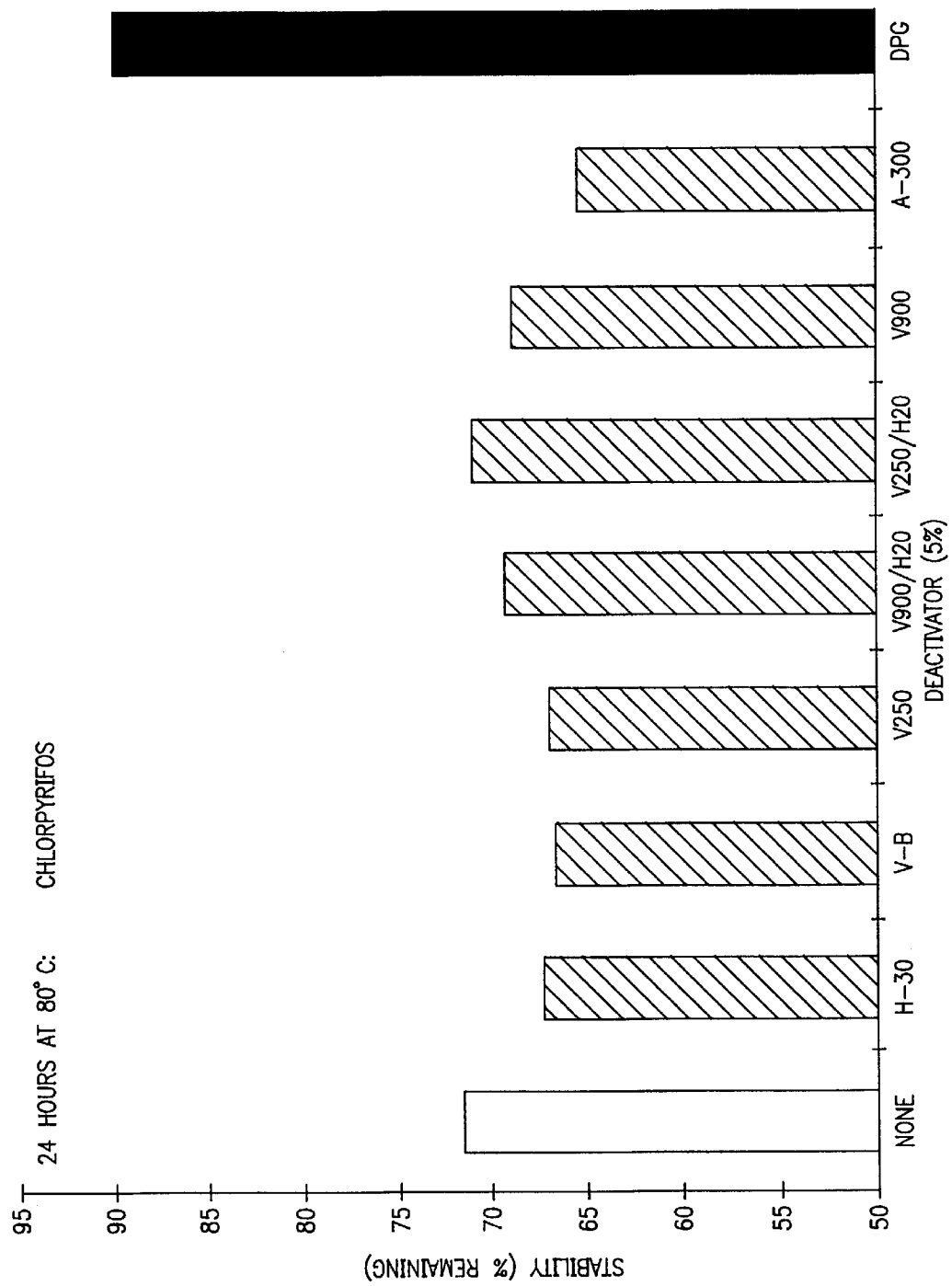
FIG. 2 is a histogram illustrating the accelerated stability results for Dursban™ on reconstituted Georgia clay fines containing 5% by wt. inorganic salt (aluminum oxide).
Figure 3:
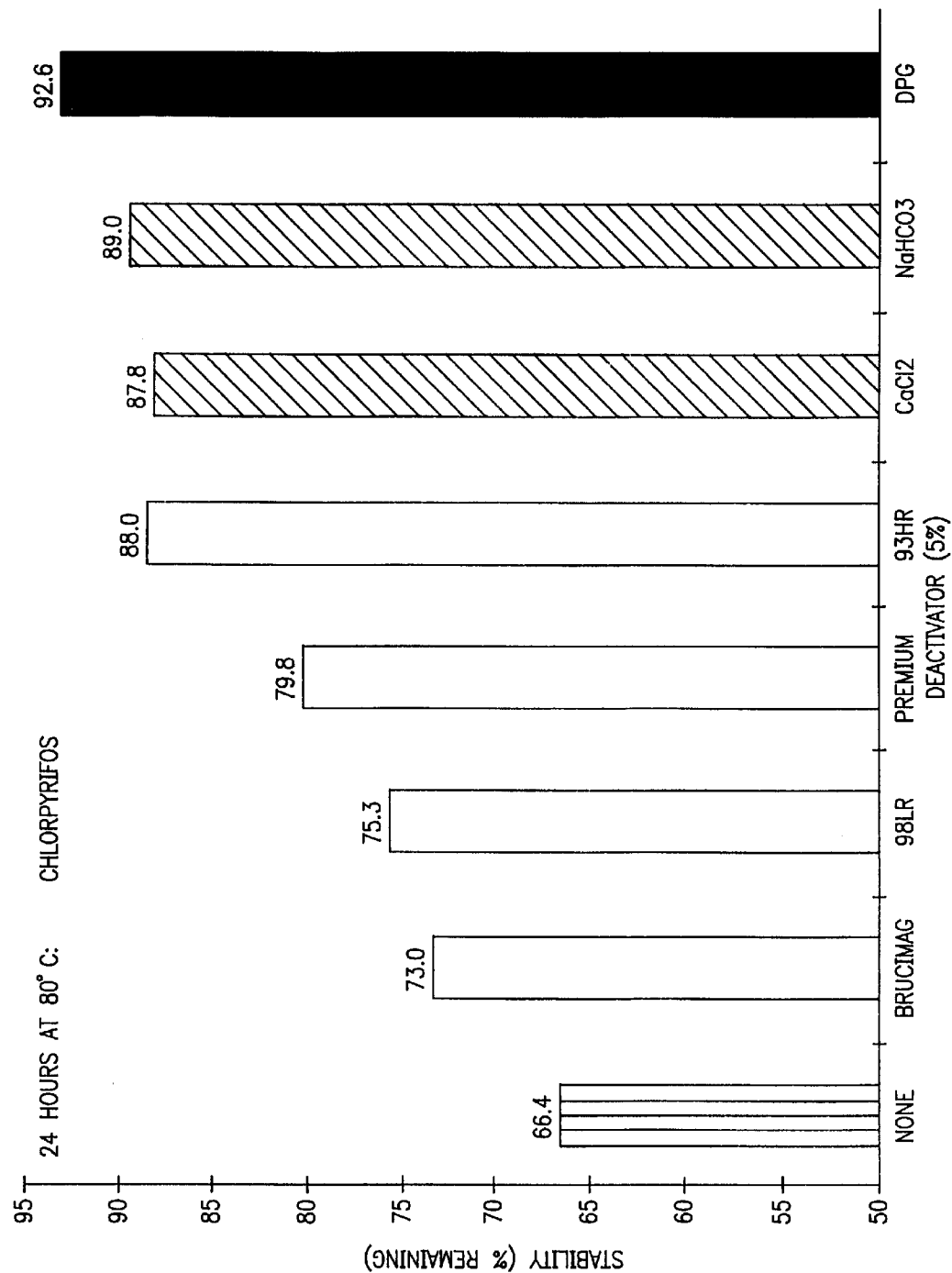
FIG. 3 is a histogram illustrating the accelerated stability results for Dursban™ on reconstituted Mississippi clay fines containing 5% by wt. inorganic salt (magnesium oxide, calcium chloride, or sodium bicarbonate).
Figure 4:
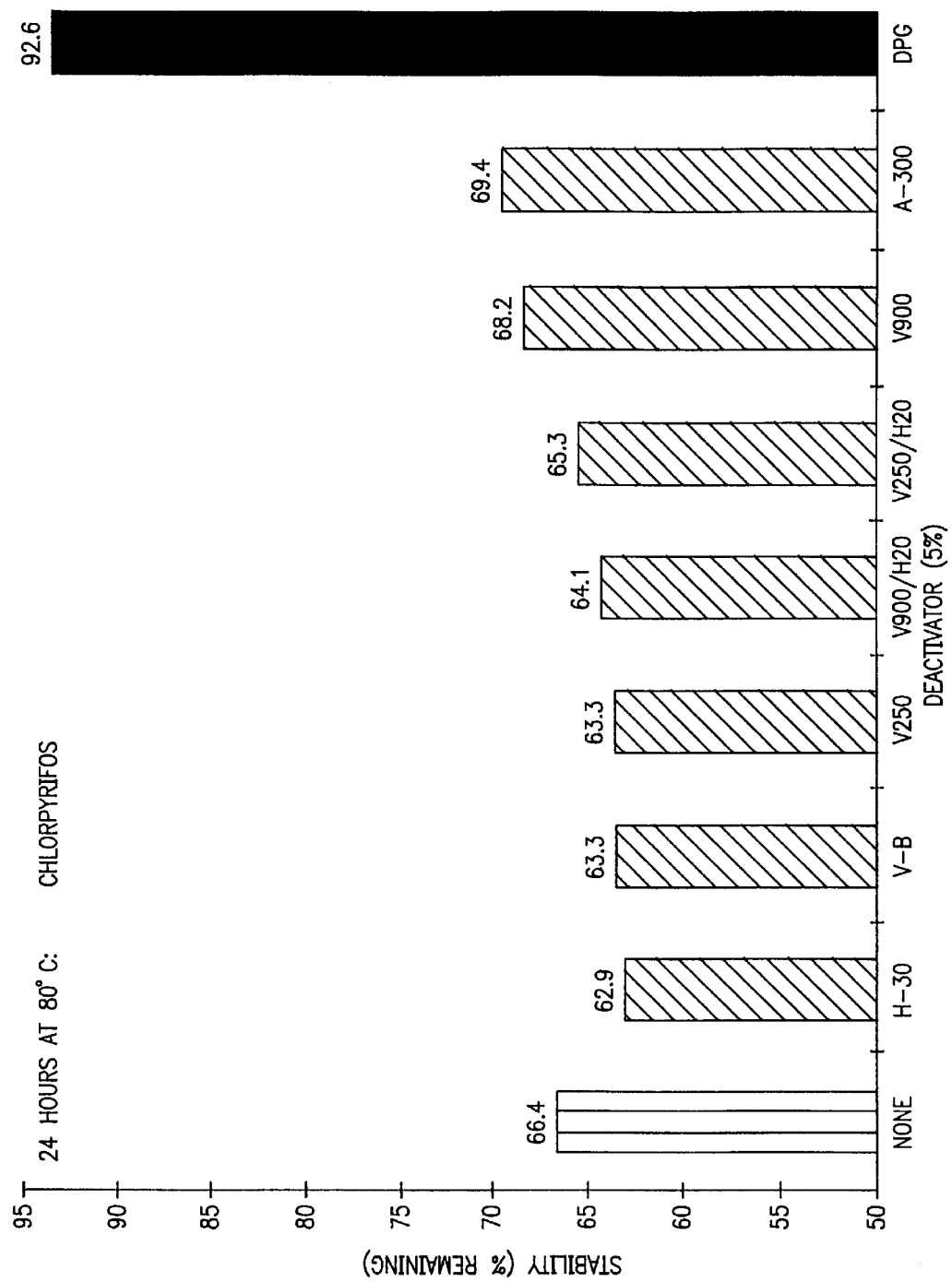
FIG. 4 is a histogram illustrating accelerated stability results for Dursban™ on reconstituted Mississippi clay fines containing 5% by wt. inorganic salt (aluminum oxide).

FIG. 1 is a histogram illustrating the accelerated stability results for Dursban™ on reconstituted Georgia clay fines containing 5% by wt. inorganic salt (magnesium oxide, calcium chloride, or sodium bicarbonate). FIG. 2 is a histogram illustrating the accelerated stability results for Dursban™ on reconstituted Georgia fines containing 5% by wt. inorganic salt (aluminum oxide). FIG. 3 is a histogram illustrating the accelerated stability results for Dursban™ on reconstituted Mississippi clay fines containing 5% by wt. inorganic salt (magnesium oxide, calcium chloride, or sodium bicarbonate). FIG. 4 is a histogram illustrating accelerated stability results for Dursban™ on reconstituted Mississippi fines containing 5% by wt. inorganic salt (aluminum oxide).

Both types of clays tested (Georgia and Mississippi) with dipropylene glycol, sodium bicarbonate, calcium chloride, or magnesium oxide as deactivators exhibited enhanced stability toward the pesticide relative to an untreated clay. The alumina deactivators used in conjunction with these clays did not impart stability to the product.

EXAMPLE 4

Stability of Diazinon™ on Clay Fluxated with Deactivators

The fluxated clay was dried for about two hours at about 105° C. About 41.47 g of the dried clay was placed into a one pint wide-mouth mason jar and placed into a desiccator for about 2 hours. The dried clay was then placed in a horizontal spinner apparatus and was started spinning at a rate of approximately 90 rpm. About 8.53 g of Diazinon was misted onto the dried clay while it was spinning. The jar was agitated to break up any clumps of clay. The spinning was resumed for five more minutes to evenly distribute the pesticide. The stability tests were completed as described in EXAMPLE 3 and the results are shown below as isotherms (FIGS. 5–8).

Figure 5:
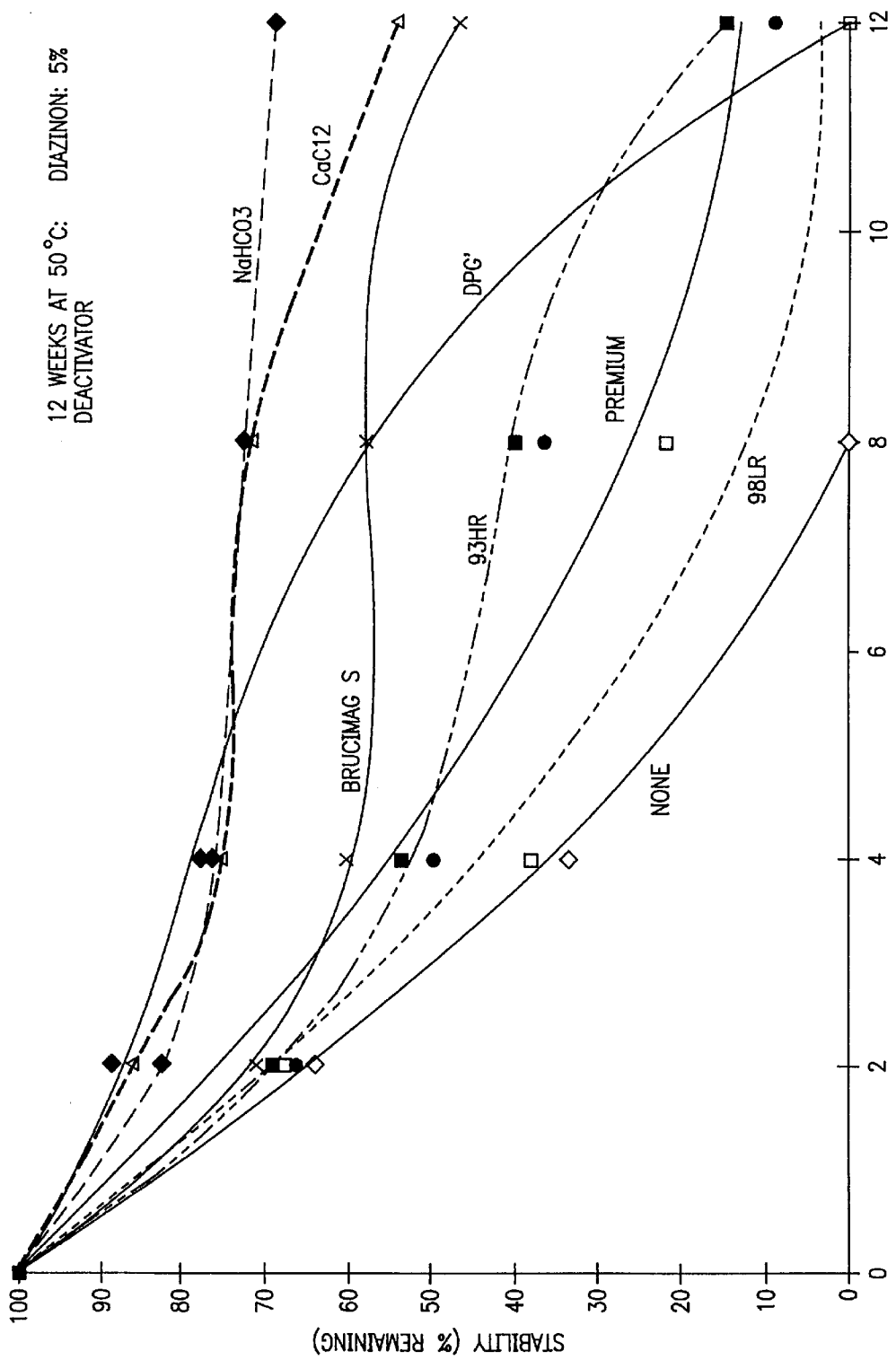
FIG. 5 is an isotherm illustrating the accelerated stability results for Diazinon™ on reconstituted Georgia clay fines containing 5% by wt. inorganic salt (magnesium oxide, calcium chloride, or sodium bicarbonate).
Figure 6:
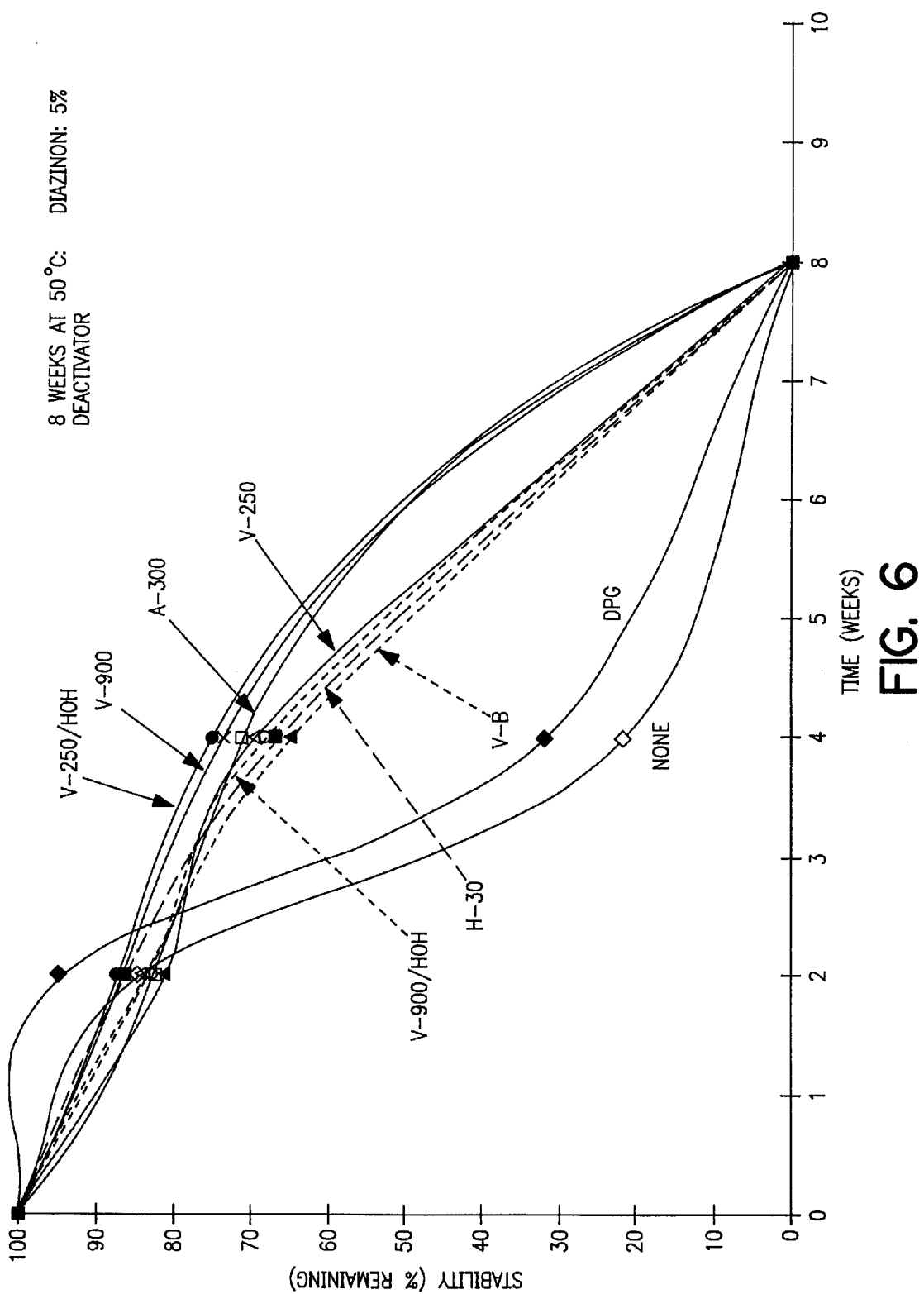
FIG. 6 is an isotherm illustrating the accelerated stability results for Diazinon™ on reconstituted Georgia clay fines containing 5% by wt. inorganic salt (aluminum oxide).
Figure 7:
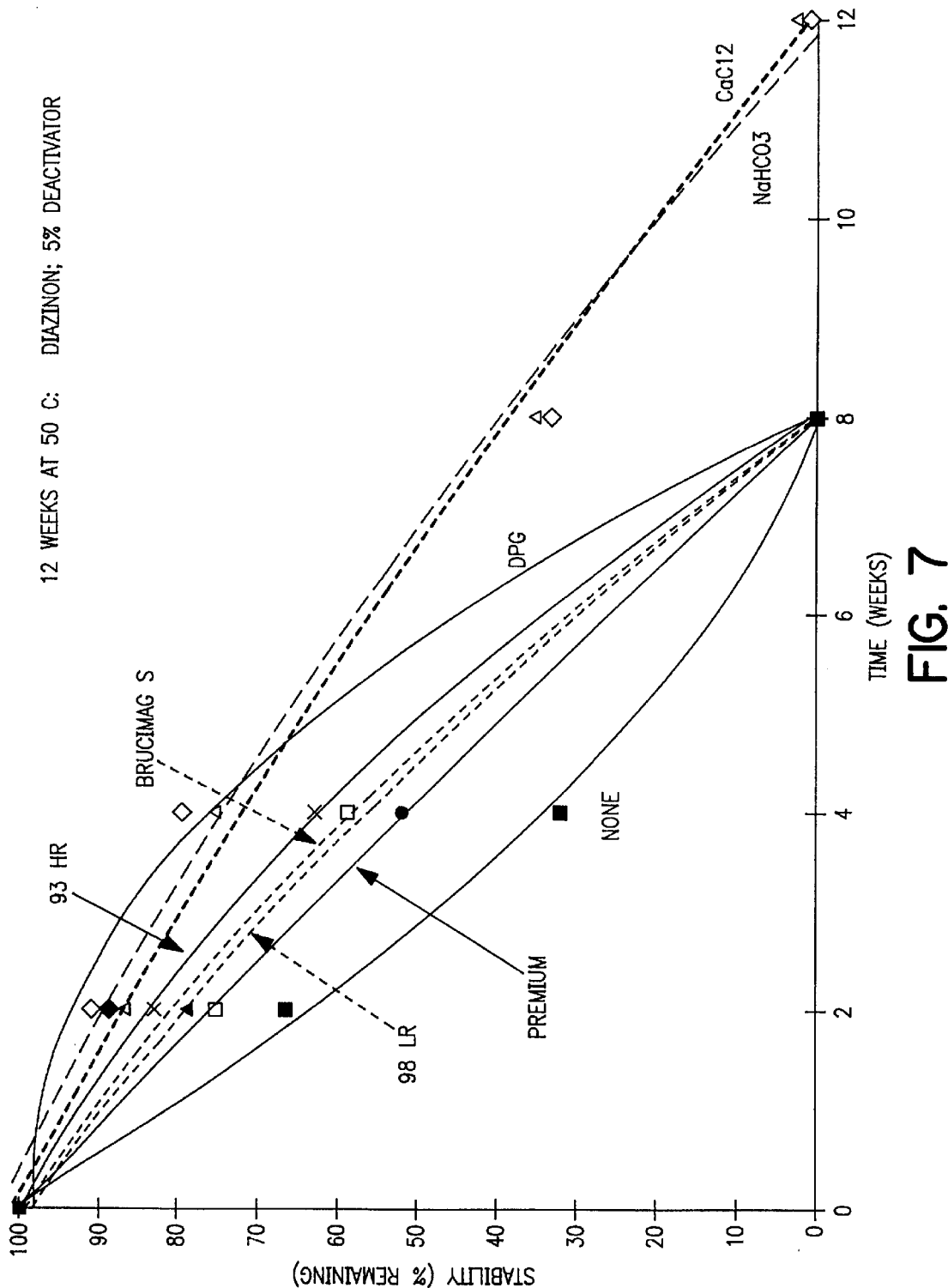
FIG. 7 is an isotherm illustrating the accelerated stability results for Diazinon™ on reconstituted Mississippi clay fines containing 5% by wt. inorganic salt (magnesium oxide, calcium chloride, or sodium bicarbonate).
Figure 8:
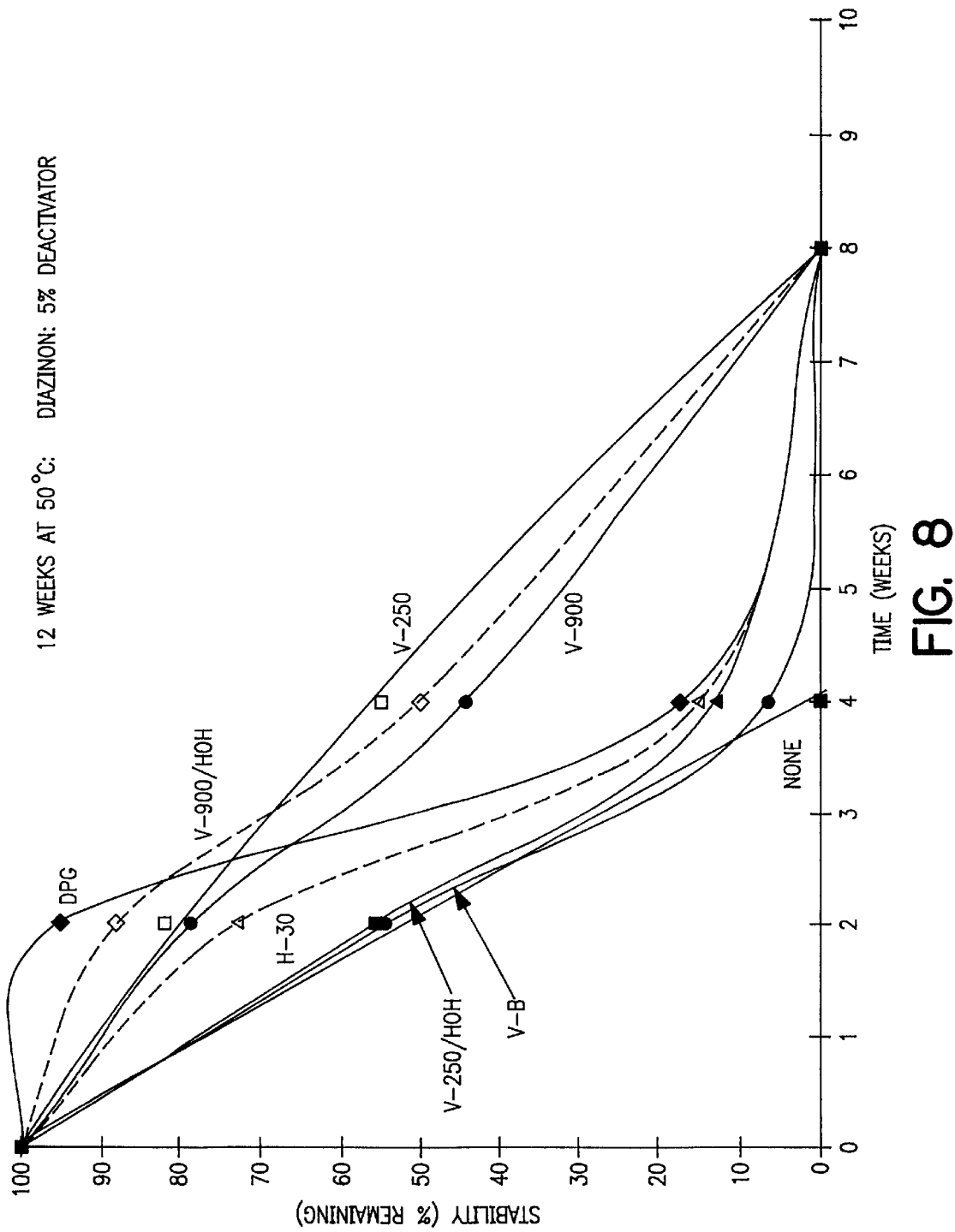
FIG. 8 is an isotherm illustrating the accelerated stability results for Diazinon™ on reconstituted Mississippi clay fines containing 5% by wt. inorganic salt (aluminum oxide).

FIG. 5 is an isotherm illustrating the accelerated stability results for Diazinon™ on reconstituted Georgia fines containing 5% by wt. inorganic salt (magnesium oxide, calcium chloride, or sodium bicarbonate). FIG. 6 is an isotherm illustrating the accelerated stability results for Diazinon™ on reconstituted Georgia fines containing 5% by wt. inorganic salt (aluminum oxide). FIG. 7 is an isotherm illustrating the accelerated stability results for Diazinon™ on reconstituted Mississippi fines containing 5% by wt. inorganic salt (magnesium oxide, calcium chloride, or sodium bicarbonate). FIG. 8 is an isotherm illustrating the accelerated stability results for Diazinon™ on reconstituted Mississippi fines containing 5% by wt. inorganic salt (aluminum oxide).

The data indicates that both Georgia and Mississippi clays incorporating dipropylene glycol (post-addition) or sodium bicarbonate, calcium chloride, and magnesium oxide pre-added as deactivators enhanced the stability of Diazinon™ relative to the untreated clay. As with Dursban™, the incorporation of alumina deactivators had no long term positive effect.

EXAMPLE 5

Stability of Diazinon™ on Clays Fluxated with Various Deactivators

The procedure for preparing the fluxated clay was as follows: Using the proportions shown in TABLES 3 and 4, salt solutions were prepared and poured into hand-held spray bottles. The appropriate weight of granulated clay (Mississippi clay) was then placed into a small disk spinner and rotation commenced. The salt solutions were then sprayed onto the clay in the rotating disk spinner with the hand-held spray bottles, breaking up lumps if formed. When completed, the salt-impregnated clay samples were then fluxated at the appropriate temperatures as reported in TABLES 5 and 6, below.

TABLE 3

Quantities Used to Prepare Clays Treated with 1.3 Equivalents of Fluxing Agent

| Compound | Molarity of Solution | Grams of Compound | Volume to make of Solution | Weight Clay (g) | ml of Solution to Apply |
|---|---|---|---|---|---|
| KCl | 3.19 | 59 | 250 | 800 | 326 |
| NaCl | 4.33 | 63 | 250 | 800 | 240 |
| $Na_2SiO_3$ | 2.17 | 66 | 250 | 800 | 240 |
| $CaCl_2$ | 2.17 | 60 | 250 | 800 | 240 |
| $MgCl_2.H_2O$ | 2.17 | 110 | 250 | 800 | 240 |

TABLE 3-continued

Quantities Used to Prepare Clays Treated with 1.3 Equivalents of Fluxing Agent

| Compound | Molarity of Solution | Grams of Compound | Volume to make of Solution | Weight Clay (g) | ml of Solution to Apply |
|---|---|---|---|---|---|
| NH$_4$Cl | 4.33 | 57 | 250 | 800 | 240 |
| LiCl | 4.33 | 45 | 250 | 800 | 240 |
| K$_2$CO$_3$ | 2.17 | 75 | 250 | 800 | 240 |
| Na$_2$CO$_2$ | 2.17 | 115 | 500 | 800 | 240 |
| Na$_4$SiO$_4$ | 1.08 | 50 | 250 | 800 | 240 |
| MgSiF6 | 2.17 | 63 | 250 | 593 | 250 |

TABLE 4

Quantities Used to Prepare Clays Treated with 0.65 Equivalents of Fluxing Agent

| Compound | Molarity of Solution | Grams of Compound | Volume to make of Solution | Weight Clay (g) | ml of Solution to Apply |
|---|---|---|---|---|---|
| KCl | 2.17 | 40.15 | 250 | 800 | 240 |
| NaCl | 2.17 | 31.47 | 250 | 800 | 240 |
| Na$_2$SiO$_3$ | 1.08 | 32.94 | 250 | 800 | 240 |
| CaCl$_2$ | 1.08 | 29.97 | 250 | 800 | 240 |
| MgCl$_2$.H$_2$O | 1.08 | 54.81 | 250 | 800 | 240 |
| NH$_4$Cl | 2.17 | 28.75 | 250 | 800 | 240 |
| LiCl | 2.17 | 22.79 | 250 | 800 | 240 |
| K$_2$CO$_3$ | 1.08 | 37.26 | 250 | 800 | 240 |
| Na$_2$CO$_3$ | 1.08 | 57.24 | 500 | 800 | 240 |
| Na$_4$SiO$_4$ | 0.54 | 24.84 | 250 | 800 | 240 |
| Ca(CHO$_2$)$_2$ | 1.08 | 35.10 | 250 | 800 | 240 |
| MgSiF6 | 1.08 | 44.01 | 250 | 800 | 240 |
| NH$_4$HCO$_3$ | 1.51 | 29.82 | 250 | 800 | 344 |
| LiOH*H$_2$O | 1.50 | 31.50 | 500 | 800 | 347 |

TABLE 5

Physical Properties of Clays Fluxated with 1.3 eq. of Flux Agent

| Flux Agent | Temp. (°F.) | Density (lb/ft$^3$) | pH | LHC (%) | Surface Area (m$^2$/g) | Pore Vol. (ml/g) | Pore Diam (nm) |
|---|---|---|---|---|---|---|---|
| CaCl$_2$ | 1350 | 35.2 | 6.2 | 33 | 52.6 | 0.2594 | 19.7 |
| CaCl$_2$ | 1200 | 35.8 | 7.8 | 33 | 56.1 | 0.2135 | 15.2 |
| CaCl$_2$ | 1050 | 35.5 | 8.8 | 31 | 57.9 | 0.2372 | 16.4 |
| K$_2$CO$_3$ | 1350 | 36.7 | 8.5 | 31 | 30.4 | 0.2256 | 29.7 |
| K$_2$CO$_3$ | 1200 | 37 | 9.1 | 31 | 31.5 | 0.2433 | 30.9 |
| K$_2$CO$_3$ | 1050 | 36.6 | 9 | 31 | 29 | 0.2271 | 31.4 |
| KCl | 1350 | 37.2 | 5.4 | 31 | 31.4 | 0.2529 | 32.1 |
| KCl | 1200 | 37.4 | 5.6 | 31 | 39.9 | 0.2041 | 20.5 |
| KCl | 1050 | 37.3 | 5.1 | 29 | 50.2 | 0.2168 | 17 |
| LiCl | 1350 | 35.6 | 8.9 | 31 | 38.6 | 0.2377 | 24.6 |
| LiCl | 1200 | 34.8 | 7.9 | 34 | 44.3 | 0.2177 | 19.7 |
| LiCl | 1050 | 35.1 | 8.1 | 33 | 50.4 | 0.2462 | 19.5 |
| MgCl$_2$.6 H$_2$O | 1350 | 35 | 7.1 | 33 | 68.2 | 0.2606 | 15.3 |
| MgCl$_2$.6 H$_2$O | 1200 | 34.9 | 3.8 | 34 | 88.2 | 0.2523 | 11.4 |
| MgCl$_2$.6 H$_2$O | 1050 | 35 | 8.9 | 31 | 75.9 | 0.2526 | 13.3 |
| MgSiF$_6$ | 1350 | 36.7 | 3.1 | 31 | 64.7 | 0.2599 | 16.1 |
| MgSiF$_6$ | 1200 | 36.8 | 2.6 | 31 | 90.7 | 0.2751 | 12.1 |
| MgSiF$_6$ | 1050 | 36.1 | 3.3 | 31 | 105.8 | 0.2711 | 10.2 |
| Na$_2$CO$_3$ | 1350 | 35.7 | 8.6 | 30 | 19.8 | 0.1681 | 30.3 |
| Na$_2$CO$_3$ | 1200 | 35.5 | 9.1 | 31 | 37.8 | 0.2191 | 23.2 |
| Na$_2$CO$_3$ | 1050 | 35.5 | 9.8 | 30 | 38.4 | 0.2114 | 22 |
| Na$_4$SiO$_3$ | 1350 | 39.6 | 8.4 | 27 | 11.4 | 0.1269 | 35.1 |
| Na$_2$SiO$_3$ | 1200 | 39.2 | 8.2 | 29 | 32.8 | 0.1866 | 22.8 |
| Na$_2$SiO$_3$ | 1050 | 38.8 | 8.9 | 27 | 34.9 | 0.1693 | 19.4 |
| Na$_4$SiO$_4$ | 1350 | 38.1 | 8.4 | 29 | 16.1 | 0.1635 | 31.1 |
| Na$_4$SiO$_4$ | 1200 | 38.3 | 8.3 | 30 | 37.1 | 0.2042 | 22 |
| Na$_4$SiO$_4$ | 1050 | 38.8 | 8.9 | 29 | 40.1 | 0.1731 | 17.3 |
| NaCl | 1350 | 35.3 | 7.5 | 31 | 28.8 | 0.2464 | 34.2 |
| NaCl | 1200 | 35.8 | 6.5 | 31 | 47 | 0.2188 | 18.6 |
| NaCl | 1050 | 36 | 6 | 30 | 65.4 | 0.2401 | 14.7 |
| NH$_4$Cl | 1350 | 34.8 | 4.3 | 33 | 100.4 | 0.3155 | 12.6 |
| NH$_4$Cl | 1200 | 36.1 | 6.2 | 33 | 72.2 | 0.2616 | 14.5 |
| NH$_4$Cl | 1050 | 34.8 | 3.5 | 34 | 93.7 | 0.2725 | 11.6 |

TABLE 5-continued

Physical Properties of Clays Fluxated with 1.3 eq. of Flux Agent

| Flux Agent | Temp. (°F.) | Density (lb/ft$^3$) | pH | LHC (%) | Surface Area (m$^2$/g) | Pore Vol. (ml/g) | Pore Diam (nm) |
|---|---|---|---|---|---|---|---|
| *Na$_2$CO$_3$ | 900 | 35 | 10 | 30 | 40.4 | 0.1644 | 15.4 |
| Untreated | 1350 | 34.7 | 4.1 | 35 | 69.9 | 0.2504 | 13.6 |
| Untreated | 1350 | 34.5 | 4.5 | 34 | 85.7 | 0.2876 | 13.4 |
| Untreated | 1200 | 34.6 | 3.9 | 35 | 92.5 | 0.2858 | 12.4 |
| Untreated | 1200 | 35.3 | 3.3 | 34 | 93 | 0.298 | 12.8 |
| Untreated | 1050 | 34.5 | 3.9 | 34 | 94.3 | 0.2708 | 11.5 |
| Untreated | 1050 | 34.7 | 3.1 | 34 | 94 | 0.2942 | 12.5 |

*This is a Georgia clay sample. The remainder of the samples are Mississippi clay.

TABLE 6

Physical Properties of Clays Fluxated with 0.65 eq. of Flux Agent

| Flux Agent | Temp. (°F.) | Density (lb/ft$^3$) | pH | LHC (%) | Surface Area (m$^2$/g) | Pore Vol. (ml/g) | Pore Diam (nm) |
|---|---|---|---|---|---|---|---|
| Ca(CHO$_2$)$_2$ | 1350 | 34.9 | 7.8 | 32 | 65.1 | 0.2473 | 15.2 |
| Ca(CHO$_2$)$_2$ | 1050 | 35.5 | 9.2 | 32 | 73.7 | 0.2518 | 13.7 |
| CaCl$_2$ | 1350 | 34.5 | 5.9 | 31 | 71.5 | 0.2665 | 14.9 |
| CaCl$_2$ | 1050 | 34.6 | 7.4 | 34 | 73.2 | 0.2574 | 14.1 |
| K$_2$CO$_3$ | 1350 | 35.7 | 7.8 | 32 | 53.6 | 0.2501 | 18.6 |
| K$_2$CO$_3$ | 1050 | 35.7 | 8.7 | 32 | 55.7 | 0.2449 | 17.6 |
| K$_2$CO$_3$ | 900 | 36.3 | 9 | 32 | 57.6 | 0.2614 | 18.2 |
| KCl | 1350 | 35.5 | 5.3 | 32 | 47.5 | 0.2587 | 21.8 |
| KCl | 1050 | 35.7 | 4.6 | 31 | 62.7 | 0.2524 | 16.1 |
| LiCl | 1350 | 35.1 | 6.4 | 33 | 63 | 0.2552 | 16.2 |
| LiCl | 1050 | 34.5 | 6.5 | 34 | 84 | 0.2656 | 12.6 |
| LiOH.H$_2$O | 1350 | 35.5 | 6.9 | 31 | 52.9 | 0.2302 | 17.4 |
| LiOH.H$_2$O | 1050 | 34.7 | 8 | 33 | 70.3 | 0.2537 | 14.4 |
| LiOH.H$_2$O | 900 | 35 | 7.2 | 32 | 71.1 | 0.2537 | 14.2 |
| MgCl$_2$6.H$_2$O | 1350 | 34.6 | 5.1 | 34 | 86.2 | 0.2656 | 12.3 |
| MgCl$_2$6.H$_2$O | 1050 | 34.9 | 6.1 | 34 | 98.4 | 0.3049 | 12.4 |
| MgSiF$_6$ | 1350 | 35.5 | 3.7 | 32 | 89.2 | 0.2729 | 12.2 |
| MgSiF$_6$ | 1050 | 34.9 | 3.8 | 33 | 105 | 0.2789 | 10.6 |
| MgSiF$_6$ | 900 | 35.4 | 3.8 | 32 | 107.1 | 0.283 | 10.6 |
| Na$_2$CO$_3$ | 1350 | 35.1 | 9.1 | 33 | 52.3 | 0.2445 | 18.7 |
| Na$_2$CO$_3$ | 1050 | 34.9 | 8.7 | 32 | 54.6 | 0.2507 | 18.4 |
| Na$_2$CO$_3$ | 900 | 35.1 | 9.2 | 32 | 51.8 | 0.2183 | 16.9 |
| Na$_2$SiO$_3$ | 1350 | 36.7 | 7.2 | 31 | 47.6 | 0.2299 | 19.3 |
| Na$_2$SiO$_2$ | 1050 | 36.9 | 7.8 | 31 | 59 | 0.2418 | 16.4 |
| Na$_2$SiO$_3$ | 900 | 37.5 | 8.9 | 31 | 63.1 | 0.2489 | 15.8 |
| Na$_4$SiO$_4$ | 1350 | 36.2 | 8.2 | 32 | 57.6 | 0.2402 | 16.7 |
| Na$_4$SiO$_4$ | 1050 | 36.1 | 8.7 | 32 | 56.6 | 0.2414 | 17.1 |
| Na$_4$SiO$_4$ | 900 | 36.5 | 9.3 | 32 | 56.5 | 0.2329 | 16.5 |
| NaCl | 1350 | 34.6 | 6.4 | 33 | 52 | 0.2682 | 20.6 |
| NaCl | 1050 | 34.8 | 5.9 | 31 | 76.9 | 0.263 | 13.7 |
| NH$_4$Cl | 1350 | 34.7 | 4.1 | 33 | 91.5 | 0.2788 | 12.2 |
| NH$_4$Cl | 1050 | 34.4 | 3.1 | 34 | 92.4 | 0.2638 | 11.4 |
| NH$_4$HCO$_3$ | 1350 | 34.4 | 4.3 | 34 | 87 | 0.2689 | 12.4 |
| NH$_4$HCO$_3$ | 1050 | 33.9 | 4.5 | 34 | 107.8 | 0.3148 | 11.7 |
| NH$_4$HCO$_3$ | 900 | 34.5 | 3.6 | 34 | 86.7 | 0.2539 | 11.7 |
| *Na$_2$CO$_3$ | 900 | 34.1 | 8.3 | 31 | 71.8 | 0.2794 | 15.6 |
| Untreated | 1350 | 34.5 | 4.5 | 35 | 88.7 | 0.2888 | 13 |
| Untreated | 1350 | 34.5 | 4.1 | 34 | 81.7 | 0.2894 | 14.2 |
| Untreated | 1050 | 35 | 3.8 | 35 | 99.3 | 0.2961 | 11.9 |
| Untreated | 1050 | 34.9 | 3.7 | 35 | 92.9 | 0.2807 | 12.1 |
| Untreated | 900 | 34.9 | 3.5 | 34 | 97.1 | 0.2808 | 11.6 |

*This is a Georgia clay sample. The remainder of the samples are Mississippi clay.

Samples were tested for conversion of opaline silica to cristobalite. The tested samples were:

| I | MS clay (heated at 1500° F. for 30 minutes, 5 wt. % Na$_2$CO$_3$) |
|---|---|
| II | MS clay (heated at 1300° F. for 30 minutes, 5 wt. % Na$_2$CO$_3$) |
| III | MS clay Control (heated at 1300° F. for 30 minutes, no fluxing agent) |
| IV | GA clay (heated at 1000° F. for 30 minutes, 7 wt. % Na$_2$CO$_3$) |
| V | GA clay Control (heated 1000° F. for 20 minutes, no fluxing agent) |

A portion of each of the above samples was analyzed in bulk by x-ray diffraction to identify the crystalline phases present. A second portion of each sample was hand ground to −20 microns and digested in phosphoric acid following NIOSH Method 7601. The phosphoric acid digestion destroyed the clay, feldspars, and most of the opaline silica. The residue was enriched in quartz and cristobalite if these phases were present. The residue from the digestion was analyzed by x-ray diffraction to determine if any cristobalite was present after the dissolution of the opaline silica.

| Sample | Bulk mineralogy | Mineralogy of residue |
|---|---|---|
| I | clay, opaline silica, quartz | opaline silica, quartz |
| II | clay, quartz, opaline silica | opaline silica, quartz |
| III | similar to Sample II | quartz, trace opaline silica |
| IV | clay, quartz, feldspar | quartz |
| V | clay, quartz, feldspar | quartz |

The samples fell into three general categories. Samples IV and V were mixtures of clay and quartz with a minor amount of feldspar. These samples contained no opaline silica. The residue from the acid digestion contained only quartz and a minor amount of feldspar. There was no material noted in either bulk material or the acid residue which could be classified as cristobalite.

Samples I, II, and III were mixtures of clay, quartz, and opaline silica. The opaline silica was the dominant phase in the x-ray diffraction pattern producing strong broad diffraction peaks at about 22 and 35 degrees two-theta. The two strong diffraction peaks from the opal fall on top of any possible cristobalite peaks and are frequently mistaken for cristobalite peaks. The acid insoluble residue from these three samples shows the presence of quartz and small amounts of opaline silica. The great reduction in the strength of the opal peaks after digestion, and the lack of any distinctive peaks for cristobalite indicated that no cristobalite was present in the residue.

None of the samples contained cristobalite but they did contain opaline silica with a wide range of ordering. The opaline silica in Samples I, II, and III were the most disordered and are typical of low temperature material.

In pesticide stability tests, dipropylene glycol was added to the fluxated clay. The procedure was as follows: a sample of fluxated clay was dried overnight in an oven set to about 105° C., then kept in a desiccator. About 78.9 g of this material was weighed into a 1 pint wide-mouth mason jar which was placed into a horizontal spinner and rotated at about 90 rpm. The dried clay was misted with about 4 g of dipropylene glycol. Occasionally the jar was shaken to break up clumps. Next, the clay was misted with about 17.1 g of pesticide while the jar was again rotating. The clumps were shaken up once again. Three 5.0 g portions of the pesticide-treated material were removed as the control samples and were stored in a 50° C. oven.

To extract the pesticide, the same procedure as explained in EXAMPLE 3 was followed. The conditions for the GC were: oven temp. about 150° C., hold for about 1 min., then ramp at about 30° C./min. to about 240° C., hold for about 2 min.; injector temperature at about 250° C.; detector temperature at about 260° C., range about 10, relay on about 1 min.; He pressure about 30 ml/min., air pressure about 300 ml/min., $H_2$ pressure about 30 ml/min.

Four different experiments were done to evaluate Diazinon™ stability on treated clays. The effect of temperature, the amount of fluxing agent, and the type of fluxing agent were analyzed. The clays contained a deactivator agent. The protocol described was followed in the preparation and treatment of the clays. The proportions of fluxing agent to clays are listed in TABLE 3, above. The physical properties of the treated clays were evaluated as in the protocols described in EXAMPLE 1. The results of the physical tests are reported in TABLE 5, above.

Figure 9:
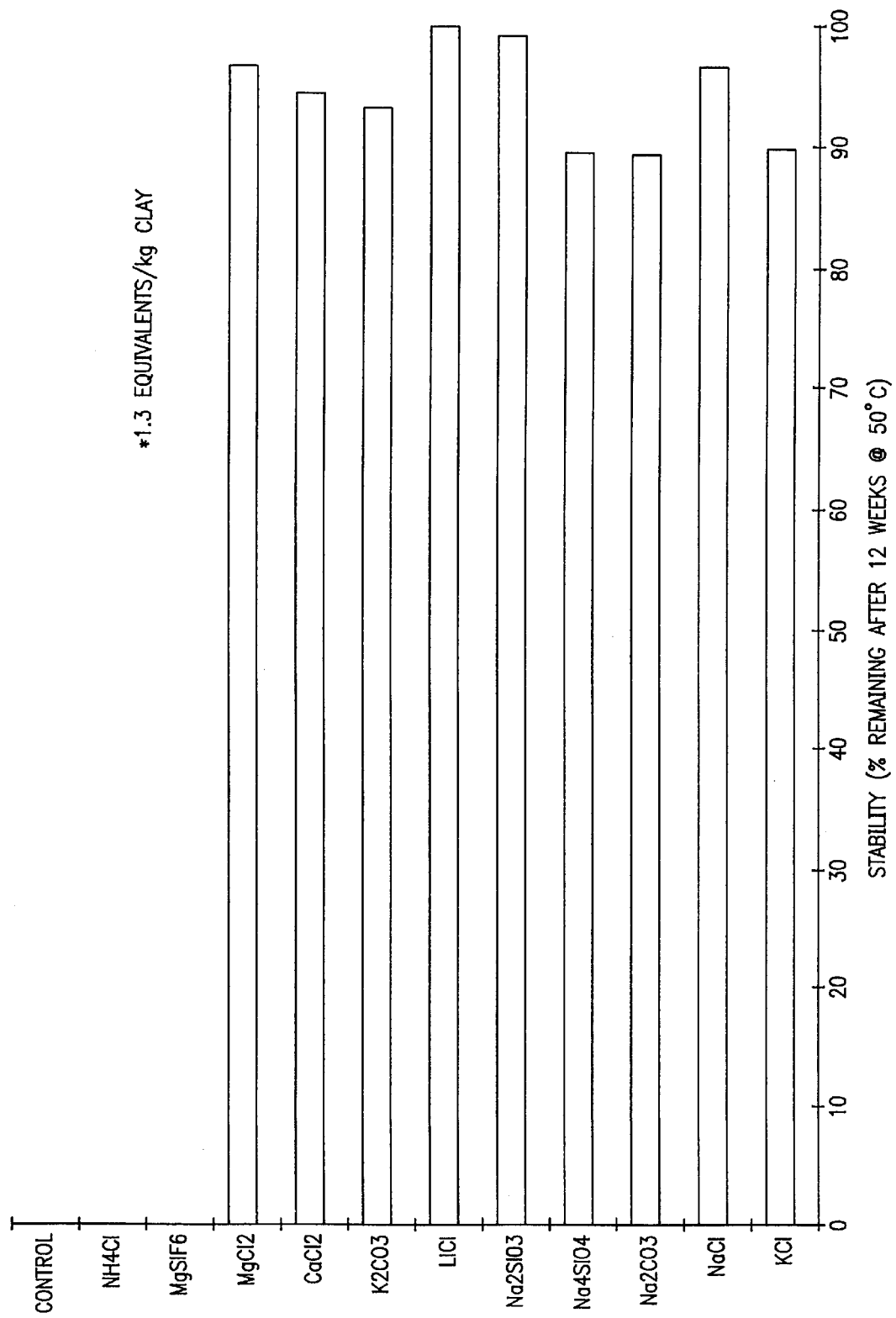
FIG. 9 is a histogram illustrating the accelerated stability results for Diazinon™ on Mississippi clay containing 1.3 equivalents of inorganic salt and heated at 1350° F.

The data in FIG. 9 resulted from measurements of the stability of Diazinon™, which was deposited on Mississippi clays fluxated with about 1.3 eq of fluxing agent at about 1350° F. After treatment, the samples had been stored for about 12 weeks at about 50° C. The data indicates that the untreated control clay was not suitable as a carrier for Diazinon™. Also, the treated clays having the fluxing agents $MgSiF_6$ and $NH_4Cl$, were not suitable carriers for Diazinon™, as the pesticide was not detectable after the treated clay was stored. The clays treated with other fluxing agents were suitable carriers for Diazinon™, as more than about 80% of the pesticide was detected after about 12 weeks of storage. Common characteristics of the untreated clay and the clays treated with $MgSiF_6$ and $NH_4Cl$ were their relatively low slurry pHs and high surface areas. In contrast, the other salt-treated clays had relatively higher slurry pHs and lower surface areas.

Figure 10:
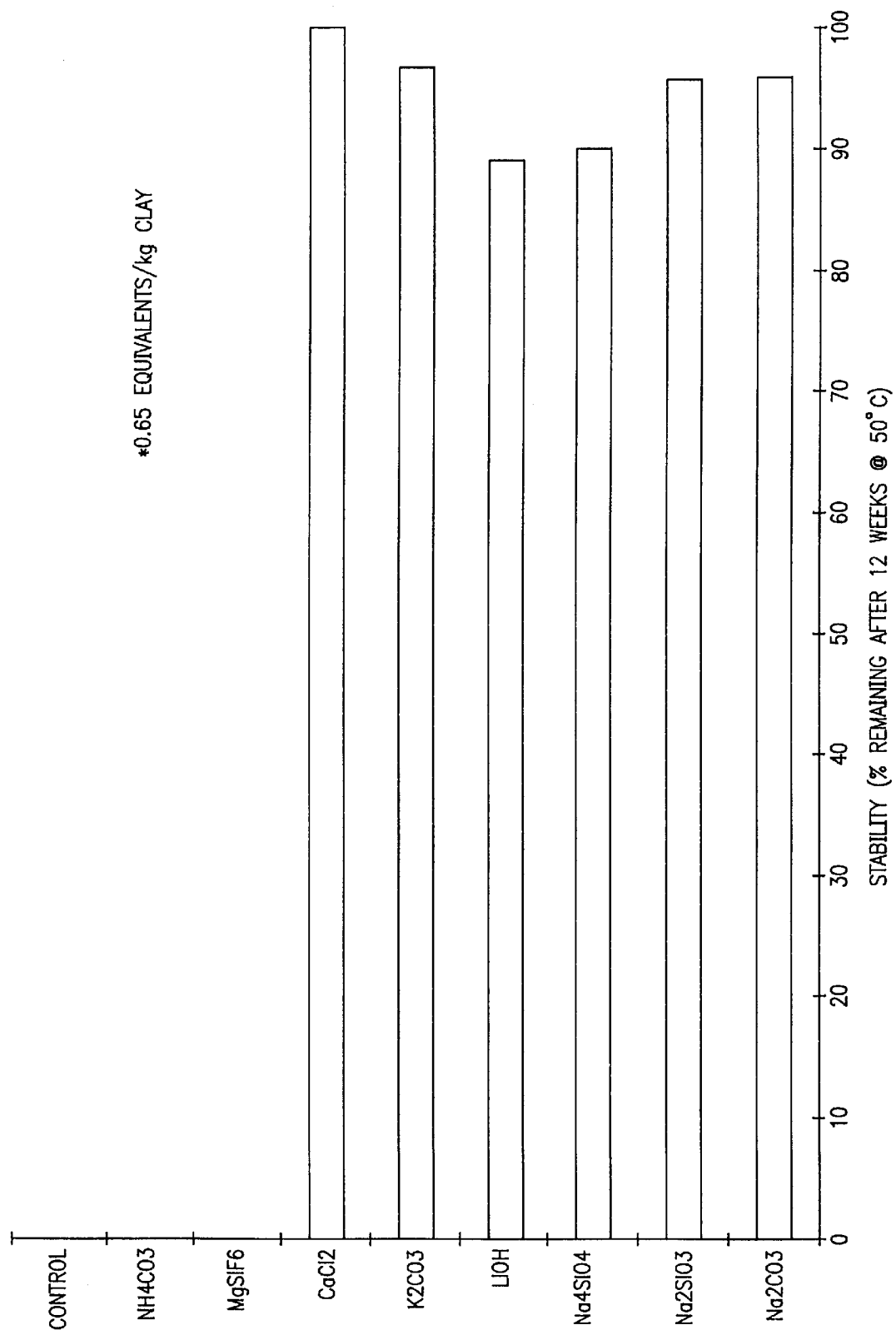
FIG. 10 is a histogram illustrating the accelerated stability results for Diazinon™ on Mississippi clay containing 0.65 equivalents of inorganic salt and heated at 1350° F.

The next study evaluated the stability of Diazinon™ on clays fluxated with less fluxing agent (0.65 eq) at 1350° F. FIG. 10 is a histogram illustrating the accelerated stability results for Diazinon™ on Mississippi clay containing 0.65 eq. of inorganic salt which was heated at 1350° F. and stored for 12 weeks at about 50° C. The data indicates that the untreated control clay was not suitable as a carrier for Diazinon™. The results of this study indicate that the clays treated with the fluxing agents, $MgSiF_6$ and $NH_4CO_3$, were not suitable as carriers for the pesticide Diazinon™. The clays treated with other fluxing agents were suitable carriers for Diazinon™, as about 100% of the pesticide was detected after about 12 weeks of storage.

Figure 11:
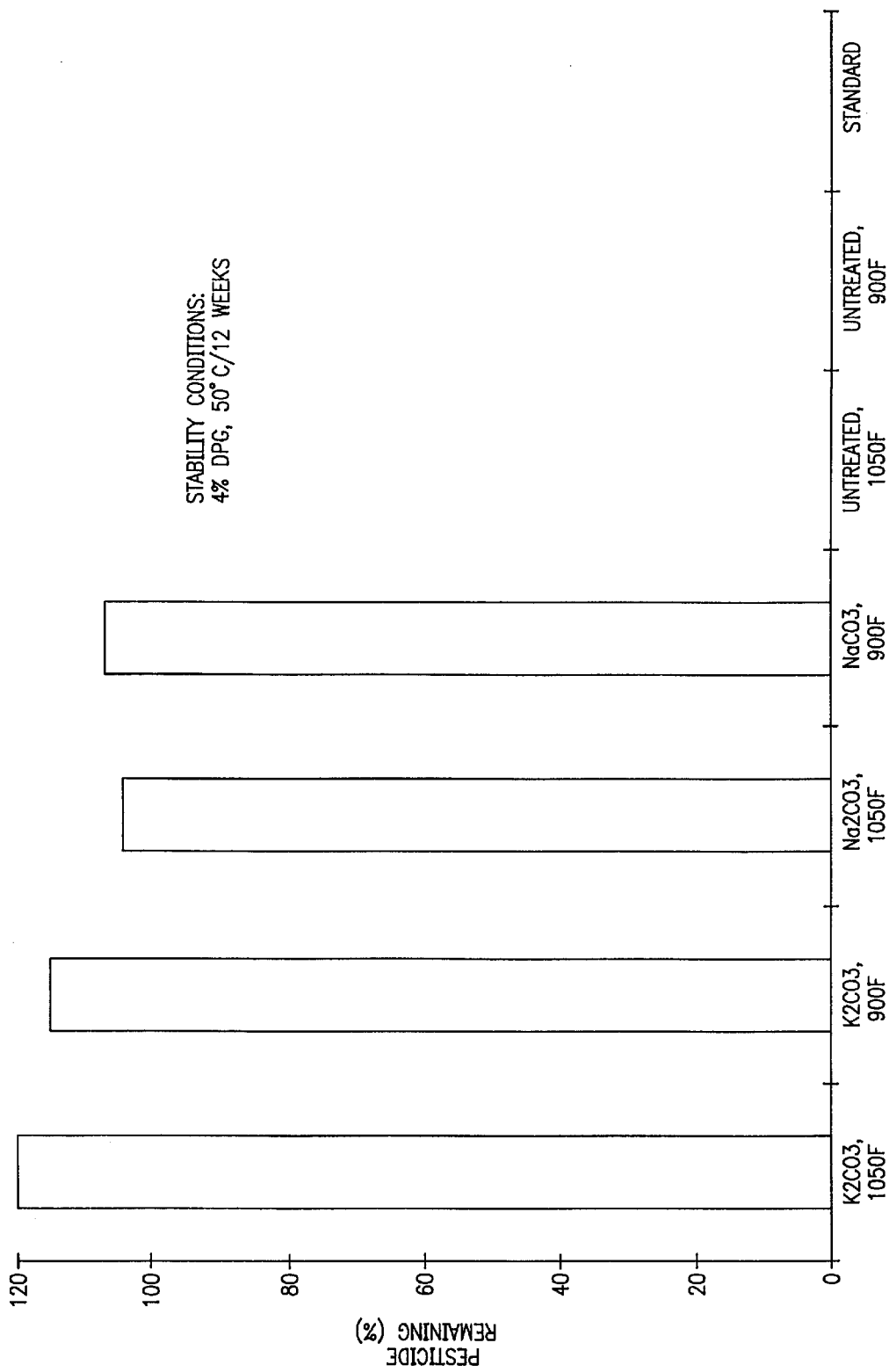
FIG. 11 is a histogram illustrating the accelerated stability results for Diazinon™ on clay containing 0.65 equivalents of either potassium carbonate or sodium carbonate and heated at either 1050° F. or 900° F.

FIG. 11 illustrates the results of a fourth stability study of Diazinon™ on clays treated with the fluxing agents (0.65 eq. $K_2CO_3$ or 0.65 eq. $Na_2CO_3$) then fluxated at 1050° F. or 900° F. The treated samples were stored for about 12 weeks at about 50° C. The results of this study indicate that the clays treated at a lower temperature with the fluxing agents, $K_2CO_3$ or $Na_2CO_3$, were suitable as carriers for the pesticide Diazinon™. After this treatment, about 100% of the pesticide was detected on the clay.

EXAMPLE 6

Physical Characteristics of Fluxated Clay with Different Modes of Sodium Carbonate Application The first sample of clay was heat treated at 1300° F. only. The second sample of clay was prepared by spraying a $Na_2CO_3$ solution (10% by weight) onto the clay then heat treating at 1300° F. The third and fourth samples were prepared by physically mixing solid particulate with $Na_2CO_3$ (5% by weight) the clay then heat treating at 1300° F. The third sample was prepared by mixing the clay with the $Na_2CO_3$ particulate as received. The particle size of this material was about 24/48 mesh, U.S. Sieve Series. The fourth sample was prepared by mixing particulate $Na_2CO_3$ that was ground to about 100 mesh size with the clay. The clay samples having particulate $Na_2CO_3$ were rolled for 30 min. to mix. All clay samples were fluxated for about 2 hours. The results are shown in TABLE 8, below.

TABLE 8

Physical Characteristics of Fluxated Clays with Different Modes of Application of Sodium Carbonate ($Na_2CO_3$)

| Treatment | Density (lb/ft³) | pH | LHC | Surface Area (m²/g) | Pore Volume (ml/g) | Mean Pore Diameter (nm) |
|---|---|---|---|---|---|---|
| Untreated clay | 32.0 | 5.1 | 35 | 88.4 | 0.2615 | 11.8 |
| Fluxated clay ($Na_2CO_3$ sprayed as 10% by wt.) | 32.7 | 9.5 | 33 | 44 | 0.2006 | 18.2 |
| Fluxated clay ($Na_2CO_3$ mixed in as received) | 34.6 | 10.4 | 33 | 85.2 | 0.2559 | 12 |
| Fluxated ($Na_2CO_3$ mixed in as −100 mesh) | 34.0 | 9.9 | 33 | 62.4 | 0.2109 | 13.5 |

The results indicate that all of the fluxated samples have a higher density, higher pH, lower LHC, and lower surface area th an the control which did not contain sodium carbonate. It is believed that these differences stem from the level of $Na_2CO_3$ distribution in clay. The clay sample having the $Na_2CO_3$ sprayed onto the clay had a more desirable quality than the clay samples having the particulate $Na_2CO_3$ blended in. Similarly, the clay sample having a particulate $Na_2CO_3$ with a finer particle size mixed in had more desirable physical properties than the sample having $Na_2CO_3$ of coarser particle size mixed in. These desirable qualities include a lower surface area, a lower density, and a lower pH. However, the preferred liquid holding $Na_2CO_3$ addition capacity of the clay was unaffect ed by the method of $Na_2CO_3$ distribution. Based on these experiments, the preferred method to use for $Na_2CO_3$ addition is spraying a solution of $Na_2CO_3$ onto the clay.

EXAMPLE 7

Stability of Diazinon™ on Fluxated Samples with Different Amounts of Deactivator Applied Clay samples 1–6 were prepared by spraying clay with a stock solution of 10% by wt. $Na_2CO_3$ to a level of about 3.4% by wt. of $Na_2CO_3$, followed by heat treatment for about 2 hours at a temperature of about 1050° F. The results are shown in TABLE 9, below.

The fluxated clay treated with as little as 1% by wt. dipropylene glycol was stable as a carrier for Diazinon™ for an extended time period.

TABLE 9

Stability of Diazinon ™ on Fluxated Clays Stored at 50° C.
Stability (% pesticide remaining)

| Sample | % DPG | 0 Day | 2 Week | 4 Week | 6 Week | 8 Week | 12 Week |
|---|---|---|---|---|---|---|---|
| 1 | 0% | 100.0 | 87.6 | 59.8 | 14.0 | 0.0 | 0.0 |
| 2 | 1% | 100.0 | 97.5 | 95.4 | 92.6 | 94.8 | 90.5 |
| 3 | 2% | 100.0 | 100.6 | 96.0 | 91.1 | 94.4 | 91.2 |
| 4 | 3% | 100.0 | 98.1 | 91.1 | 92.6 | 96.3 | 93.1 |
| 5 | 4% | 100.0 | 96.0 | 88.7 | 92.2 | 94.4 | 89.3 |
| 6 | 5% | 100.0 | 106.8 | 96.9 | 99.0 | 100.8 | 98.3 |
| Untreated | 5% | 100.0 | 87.9 | 29.2 | 0.0 | 0.0 | 0.0 |

EXAMPLE 8

Stability of Other Pesticides on Fluxated Clay Carriers

This example illustrates that the inventive fluxation procedure improves the carrier stability for other labile pesticides besides Diazinon™. Lower processing temperatures can be employed when utilizing this procedure than would otherwise be possible.

Five pilot plant samples of Georgia Clay (attapulgite-montmorillonite) having a particle size of about 16/48 mesh (U.S. Sieve Series) were selected for testing. One sample was set aside as a control. The other four samples (A–D) were heat treated at temperatures of 1100° F. for 30 min., 1400° F for 30 min., 1500° F. for 30 min., and 1500° F. for 44 min. respectively. The physical properties of these heat-treated clays were tested as described in EXAMPLE 1 .

Next, samples E–H were prepared. In this salt treatment, about 110 g of clay was placed into a 1 pint, wide-mouth mason jar. The jar was mounted onto a horizontal spinner apparatus and rotated at a speed of approximately 90 rpm. The samples were then misted with about 50 g of either a solution of about 12% by wt. sodium bicarbonate or sodium metasilicate in water to produce a salt level in the clay of about 5% by wt. After the solution was applied, the jars of clay were rotated for about one hour on a Ball mill. To fluxate the clay, the samples were heated at a temperature of either about 800° F. or 900° F. for about two hours. The physical properties of the clays were then measured as shown in TABLE 10.

Next the samples were analyzed for pesticide stability. The pesticide etridiazole was utilized. Sample preparation included drying the clay at 105° C. overnight followed by weighing out about 59 g into a 1 pint, wide-mouth mason jar. The jar and contents were spun on a horizontal spinner at a speed of about 90 rpm, misted with about 11 g of pesticide in about 12% by weight heavy aromatic solvent, and spun 10 min. more. The samples were then stored at about 80° C. awaiting GC testing. The pesticide extraction and GC analysis procedures were done as described in EXAMPLE 3.

TABLE 10

Physical Properties of Carriers

| Sample Control | Fluxation Temp °F. | Density (lb/ft³) | Slurry pH | LHC (%) | Surface Area (m²/g) | Pore Volume (cc/g) |
|---|---|---|---|---|---|---|
| Control | 900 | 33 | 5.8 | 36 | 106.6 | 0.37 |
| A | 1100 | 35 | 7.0 | 34 | 102.7 | — |
| B | 1400 | 34 | 5.9 | 35 | 89.0 | — |
| C | 1500 | 34 | 5.8 | 35 | 72.0 | — |
| D | 1500 | 35 | 6.1 | 34 | 60.4 | — |
| E | 800 | 34 | 9.6 | 33 | 79.3 | 0.31 |
| F | 900 | 34 | 9.7 | 33 | 78.1 | 0.29 |
| G | 800 | 36 | 9.4 | 33 | 73.4 | 0.28 |
| H | 900 | 35 | 7.9 | 33 | 79.2 | 0.30 |

Figure 12:
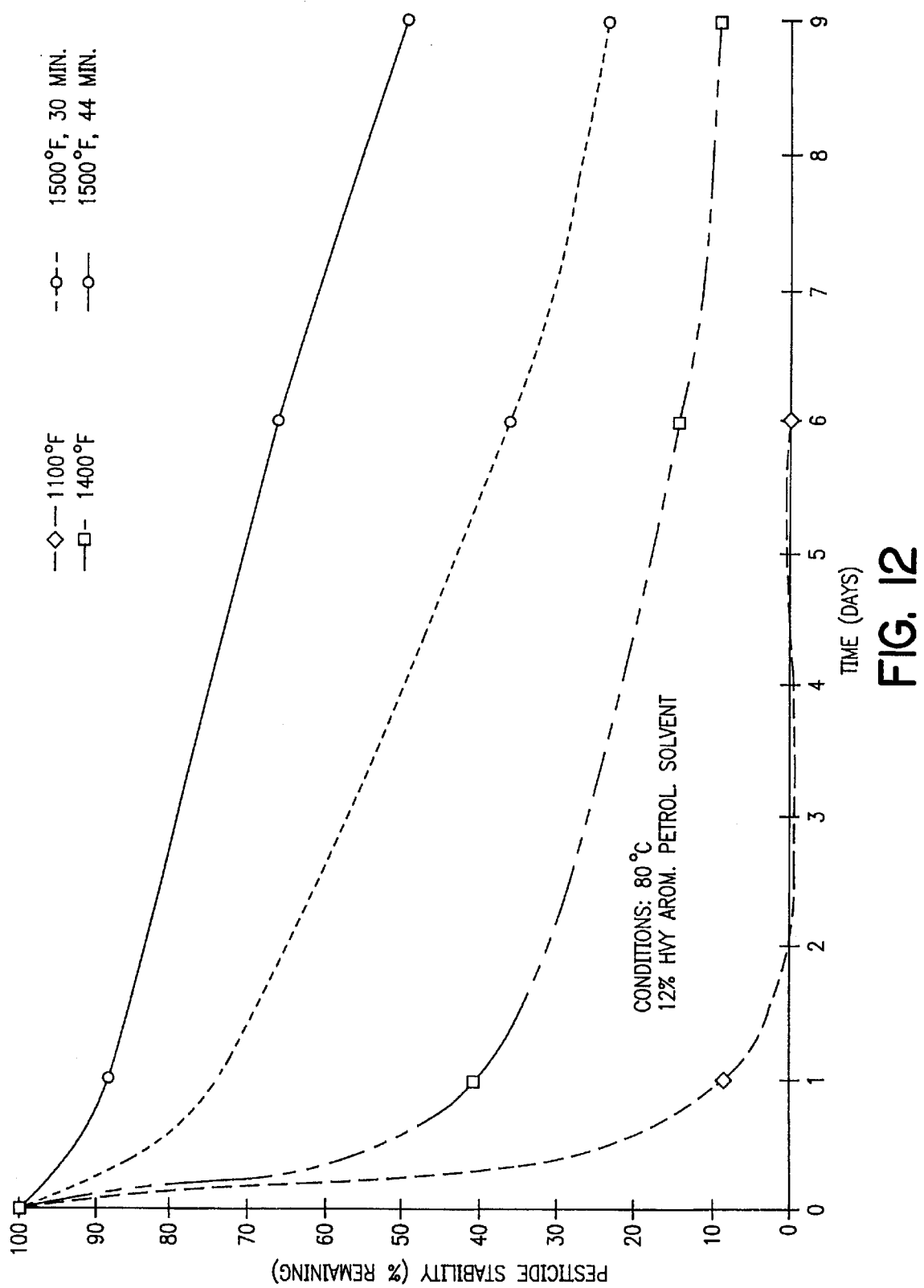
FIG. 12 is an isotherm illustrating the accelerated stability results of etridiazole on a series of Georgia clay carriers with no salt prepared in a pilot plant at increasing processing temperatures.

FIG. 12 illustrates the results of the amount of pesticide remaining versus time for the series of clay carriers described in TABLE 10(Samples A–D). The results indicate that relatively stable carriers for etridiazole can be produced using high processing temperature (about 1500° F.) and long residence times (about 45 min.).

Figure 13:
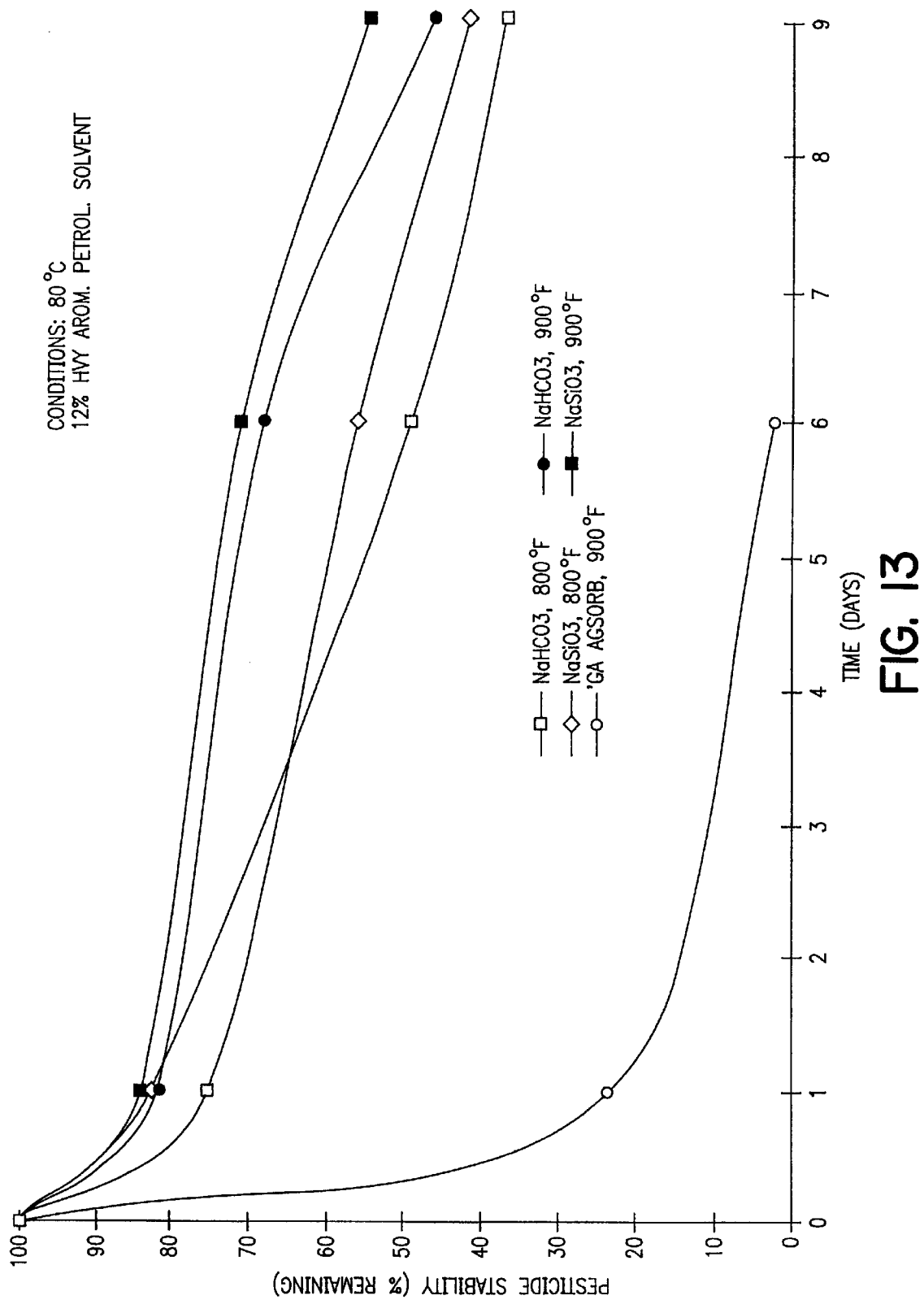
FIG. 13 is an isotherm illustrating the accelerated stability results of etridiazole on a series of Georgia clay carriers impregnated with either 5% by wt. sodium bicarbonate or sodium metasilicate and fluxated at either 800° F. or 900° F.

FIG. 13 illustrates the benefit of fluxation in the presence of salt on carrier stability for etridiazole for clay samples E-H pesticide. When tested under identical conditions for etridiazole stability, the samples treated at about 900° F. were comparable to those without salt which were heated at about 1500° F. This illustrates that by using metal salts in fluxation, a stable carrier is produced at a significantly lower temperature.

This EXAMPLE illustrates the fluxation procedure improves the carrier stability for various labile pesticides.

Lower processing temperatures can be employed when utilizing this procedure than would otherwise be possible if the fluxation process were not practiced.

Another test performed was that of the liquid holding capacity (LHC) of the product, a key performance factor. These experiments illustrate the effect of temperature on the LHC of the product. The analytical procedure is as described in EXAMPLE 3. The clay samples were prepared from Georgia clay and were heated in a muffle furnace at the temperatures shown in TABLE 11.

TABLE 11

Properties of Attapulgite Type Clays from Georgia versus Heating

| Sample ID | Heating Temp. °F. | Slurry pH | LHC (%) | Surface Area, $(m^2/g)$ | Pore Volume (cc/g) | Density $(lb/ft^3)$ |
|---|---|---|---|---|---|---|
| 1 | 900 | 6.0 | 49 | 110.1 | 0.39 | 24.7 |
|   | 1300 | 5.9 | 49 | 101.4 | 0.35 | 26.3 |
|   | 1500 | 6.4 | 44 | 38.9 | 0.22 | 27.3 |
|   | 1800 | 6.9 | 13 | 1.07 | 0.004 | 52.9 |
| 2 | unheated | 6.5 | — | 117.8 | 0.47 | 31.7 |
|   | 900 | 6.6 | 43 | 110.5 | 0.46 | 30.7 |
|   | 1200 | 5.9 | 44 | 105.8 | 0.44 | 30.4 |
|   | 1500 | 6.9 | 38 | 40.5 | 0.28 | 30.8 |
|   | 1800 | 6.5 | 13 | 0.96 | 0.003 | 52.0 |
| 3 | untreated | 7.1 | — | 114.6 | 0.33 | 37.6 |
|   | 900 | 6.0 | 35 | 104.0 | 0.33 | 32.5 |
|   | 1200 | 6.0 | 39 | 101.6 | 0.36 | 32.2 |
|   | 1500 | 6.6 | 29 | 28.9 | 0.22 | 35.8 |
|   | 1800 | 6.5 | 10 | 1.16 | 0.005 | 53.8 |
| 4 | untreated | 6.9 | — | 135.8 | 0.37 | 29.0 |
|   | 900 | 7.0 | 46 | 123.8 | 0.40 | 27.4 |
|   | 1200 | 6.4 | 51 | 110.5 | 0.34 | 27.0 |
|   | 1500 | 6.5 | 42 | 42.6 | 0.28 | 29.4 |
|   | 1800 | 6.7 | 15 | 1.04 | 0.004 | 53.5 |

The results indicate that there is a significant drop in the LHC when clay samples are heated at temperatures above 1500° F. Samples heated to temperatures in the range of about 900° F. to about 1500° F. possess excellent LHCs in the range of about 30% to about 50% by weight. However, samples heated to temperatures of about 1800° F. possessed only half that capacity (about 10% to about 15% by weight). For a preparation requiring about 4.4% by weight etridiazole with about 12% by weight heavy aromatic solvent, this LHC would be insufficient to achieve the desired loading.

EXAMPLE 9

Stability of Methomyl™

Figure 14:
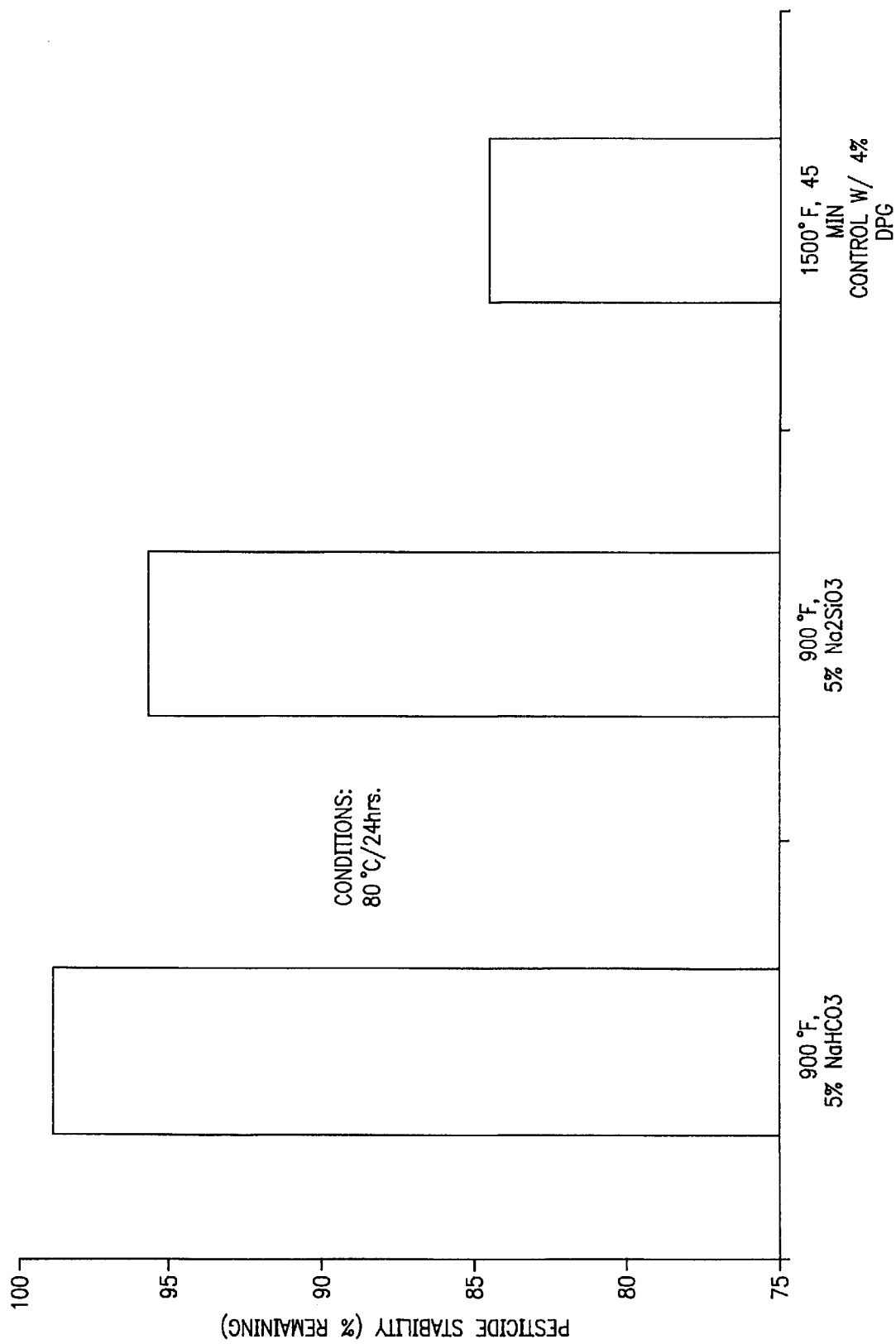
FIG. 14 is a histogram illustrating the accelerated stability results for Methomyl™ on Georgia clay containing either 5% by wt. sodium bicarbonate or sodium metasilicate.

Another pesticide, Methomyl™, was stability tested on the salt-treated fluxated clay carrier of the present invention. Samples of Georgia type attapulgite clay were impregnated with either 5% by wt. sodium bicarbonate or sodium silicate and heat-treated at a temperature of about 900° F. for about 2 hours. A comparison control sample was heat-treated at a temperature of about 1500° F. for about 45 min. then formulated with about 4% by wt. dipropylene glycol deactivator. The pesticide, Methomyl™, was then applied to the samples at a level of about 5% by wt. The stability tests were conducted as described above (EXAMPLE 8) except that the test was only conducted for 24 hours. FIG. 14 is a histogram illustrating the accelerated stability results for Methomyl™ on Georgia clay containing either 5% by wt. sodium bicarbonate or sodium metasilicate.

As previously shown in the case of etridiazole, the salt-impregnated fluxated carriers of the present invention provided enhanced stability of the pesticide Methomyl™, at a much lower fluxation temperature than is required in the absence of fluxation conditions employing a metal salt. In addition, this experiment demonstrates that salt-impregnated carriers are more stable than salt-free carriers, even when those salt-free carriers contain an organic deactivator.

EXAMPLE 10

Fluxation on Pilot Plant Scale

Figure 15:
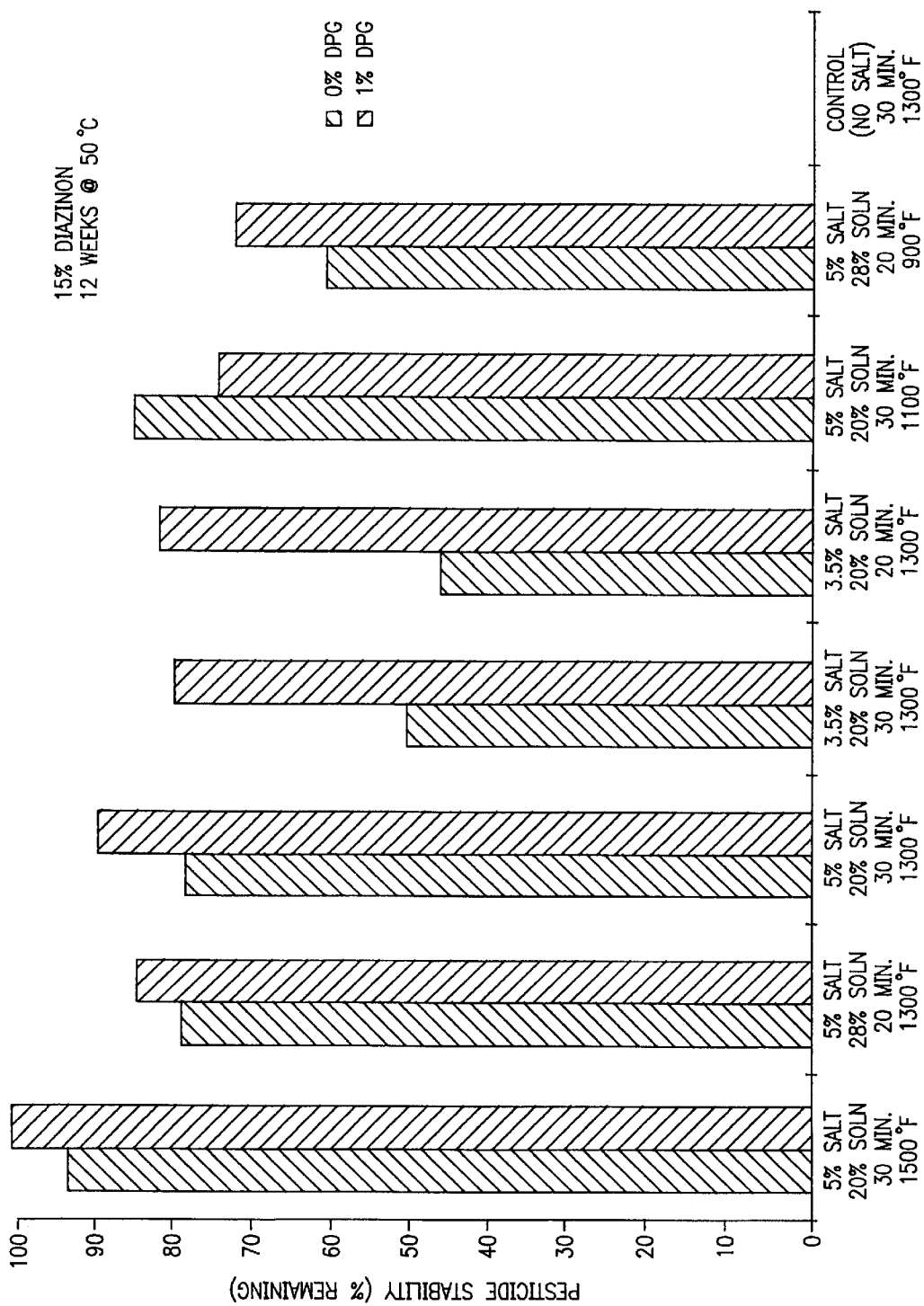
FIG. 15 is a histogram illustrating the accelerated stability results of Diazinon™ on Mississippi clay prepared in a pilot plant rotary kiln under various processing conditions.

In this EXAMPLE, a number of fluxated carriers were prepared by passage through a pilot plant rotary kiln operated in countercurrent mode. The objective was to evaluate processing variables such as salt loading, salt concentration, temperature, and residence time using equipment approximating commercial operations. Different concentrations of sodium carbonate were prepared then added in sufficient quantities to Mississippi or Georgia clays to obtain a desired salt loading (see TABLES 12 and 13 below). The clay samples were then fluxated at different temperatures for different amounts of time. The stability of the pesticide Diazinon™ (about 15% by wt.) was then evaluated as a measure of carrier performance. Some samples contained about 1% by wt. dipropylene glycol deactivator. The control was formulated with about 4% by wt. dipropylene glycol deactivator. The pesticide-treated samples were then held at about 50° C. for about 12 weeks with analysis for percentage Diazinon™ remaining. FIG. 15 is a histogram illustrating the accelerated stability results of Diazinon™ on Mississippi clay prepared in a pilot plant rotary kiln under various processing conditions. The Mississippi samples formulated with about 1% by wt. dipropylene glycol were more stable than samples formulated without the deactivator. However, the control sample which contained 4% by wt. dipropylene glycol degraded the applied pesticide so that none remained after 12 weeks of storage. Thus, the inorganic salt provides additional stabilization.

Figure 16:
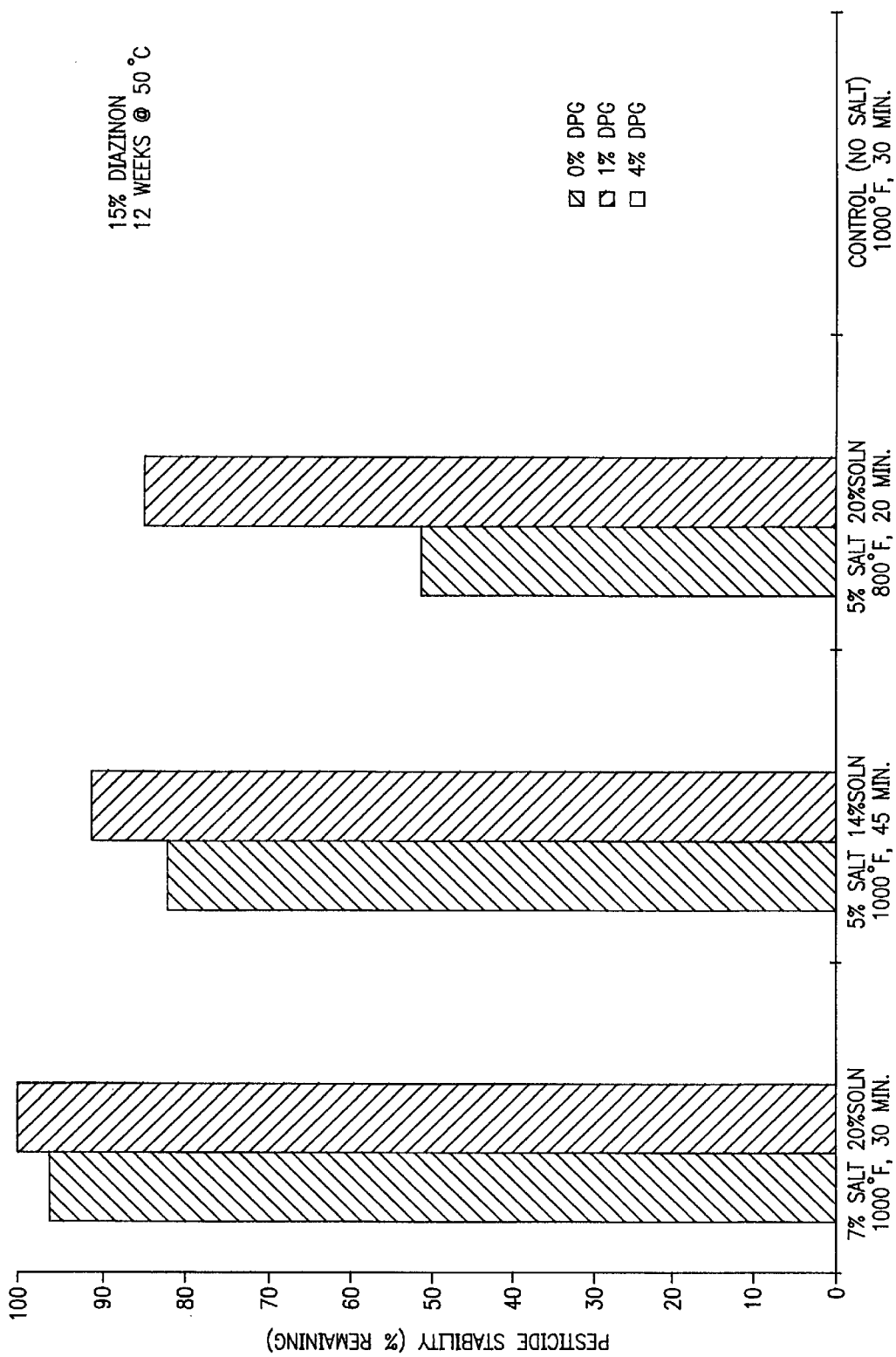
FIG. 16 is a histogram illustrating the accelerated stability results of Diazinon™ on Georgia clay prepared in a pilot plant rotary kiln under various processing conditions.

FIG. 16 is a histogram illustrating the accelerated stability results of Diazinon™ on Georgia clay prepared in a pilot plant rotary kiln under various processing conditions. In FIG. 16 as before with Georgia clays, higher salt loadings, higher processing temperatures, and longer residence times provided improved carriers with regard to Diazinon™ stability. Also, the stability of the salt-treated samples is enhanced relative to the salt-free control.

Physical properties of clays described above are listed in TABLE 12 (Mississippi clay) and TABLE 13 (Georgia clay). Procedures were done as described in EXAMPLE 1. The results listed in the TABLES illustrate that, in all cases, the salt-impregnated clays provided lower surface areas and higher pH slurries as compared to salt-free clays heat-treated at the same temperature. Although some reduction in LHC can be seen in a few cases, the extent of the reduction is modest and tolerable in light of the stability benefit.

TABLE 12

Physical Properties of Pilot Plant Run on Mississippi Clay

| Salt Loading | Soln. Conc. | Heating Temp. (°F.) | Residence Time (min) | Density (lb/ft³) | Slurry pH | LHC (%) | Surface Area (m²/g) |
|---|---|---|---|---|---|---|---|
| 5.0% | 28% | 1500 | 30 | 38 | 9.8 | 30 | 28.9 |
| 5.0% | 20% | 1300 | 30 | 39.4 | 10 | 30 | 40.9 |
| 5.0% | 28% | 1300 | 30 | 38.4 | 9.9 | 32 | 51.8 |
| 5.0% | 28% | 1300 | 20 | 35.1 | 10 | 31 | 51.4 |
| 5.0% | 28% | 1300 | 20 | 37 | 9.5 | 31 | 55.3 |
| 5.0% | 20% | 1100 | 30 | 40 | 11 | 30 | 37.3 |
| 5.0% | 28% | 1100 | 30 | 38.2 | 10 | 33 | 68.5 |
| 5.0% | 28% | 1100 | 20 | 37.5 | 9.6 | 33 | 73.8 |
| 5.0% | 28% | 900 | 30 | 37.9 | 11 | 32 | 75.4 |
| 5.0% | 28% | 900 | 20 | 38.5 | 10 | 33 | 67.2 |
| 3.5% | 20% | 1300 | 30 | 35.8 | 9.8 | 32 | 56 |
| 3.5% | 20% | 1300 | 20 | 36.3 | 9.6 | 33 | 59.5 |
| 3.5% | 20% | 1100 | 30 | 36.8 | 11 | 32 | 53 |
| 3.5% | 20% | 900 | 30 | 37.1 | 11 | 30 | 50.6 |
| 0.0% | 0% | 1300 | 30 | 34.9 | 4.9 | 35 | 91.2 |
| 0.0% | (cntrl for 28%) | 1300 | 30 | 36.1 | 5.3 | 34 | 93.6 |
| 0.0% | (cntrl for 20%) | 1300 | 30 | 37.3 | 5.2 | 34 | 94.2 |
| 0.0% | (cntrl for 20%) | 1225 | 20 | 36.9 | 5 | 33 | 89.7 |

TABLE 13

Physical Properties of Pilot Plant Run on Georgia Clay

| Salt Loading | Soln. Conc. | Heating Temp. (°F.) | Residence Time (min) | Density (lb/ft³) | Slurry pH | LHC (%) | Surface Area (m²/g) |
|---|---|---|---|---|---|---|---|
| 7.0% | 28 | 1000 | 30 | 34.5 | 10.9 | 34 | 67.4 |
| 7.0% | 28 | 1000 | 20 | 34.8 | 11.2 | 34 | 64.4 |
| 7.0% | 28 | 800 | 30 | 35.3 | 10.9 | 33 | 59.9 |
| 7.0% | 28 | 800 | 20 | 35.6 | 10.8 | 33 | 70.2 |
| 5.0% | 30 | 1000 | 45 | 34.3 | 10.4 | 34 | 71 |
| 5.0% | 24 | 1000 | 30 | 34.7 | 10.7 | 33 | 63.7 |
| 5.0% | 30 | 1000 | 30 | 34.3 | 10.5 | 34 | 57.8 |
| 5.0% | 24 | 1000 | 20 | 34.6 | 10.8 | 35 | 71.1 |
| 5.0% | 30 | 800 | 45 | 34.5 | 10.9 | 33 | 68.1 |
| 5.0% | 24 | 800 | 30 | 34.3 | 10.8 | 33 | 65.6 |
| 5.0% | 30 | 800 | 30 | 35.3 | 11.1 | 32 | 70.3 |
| 5.0% | 24 | 800 | 20 | 33.3 | 10.3 | 34 | 79.4 |
| 0.0% | (cntrl for 28%) | 1000 | 30 | 34.3 | 6.4 | 34 | 101.3 |
| 0.0% | 0 | 1000 | 20 | 32.2 | 6.1 | 36 | 106.4 |

EXAMPLE 11

Effect of Fluxation and Clay Type on Diazinon™ Stability

A number of different clay types (about 190 g each, for type see TABLE 14, below) were treated with about 50 g of a solution of about 20% by wt. sodium carbonate. The solution was sprayed onto the clays as the clay samples were rotated. After breaking up any lumps that formed, the clays were heat-treated at a temperature of about 1300° F. in a muffle furnace for about 2 hours. The samples were then formulated with about 15% by wt. Diazinon™ and were stored for 7 days at a temperature of about 80° C. The stability tests were performed as described in Example 1. The results are illustrated as a bar graph in FIG. 17.

Figure 17:
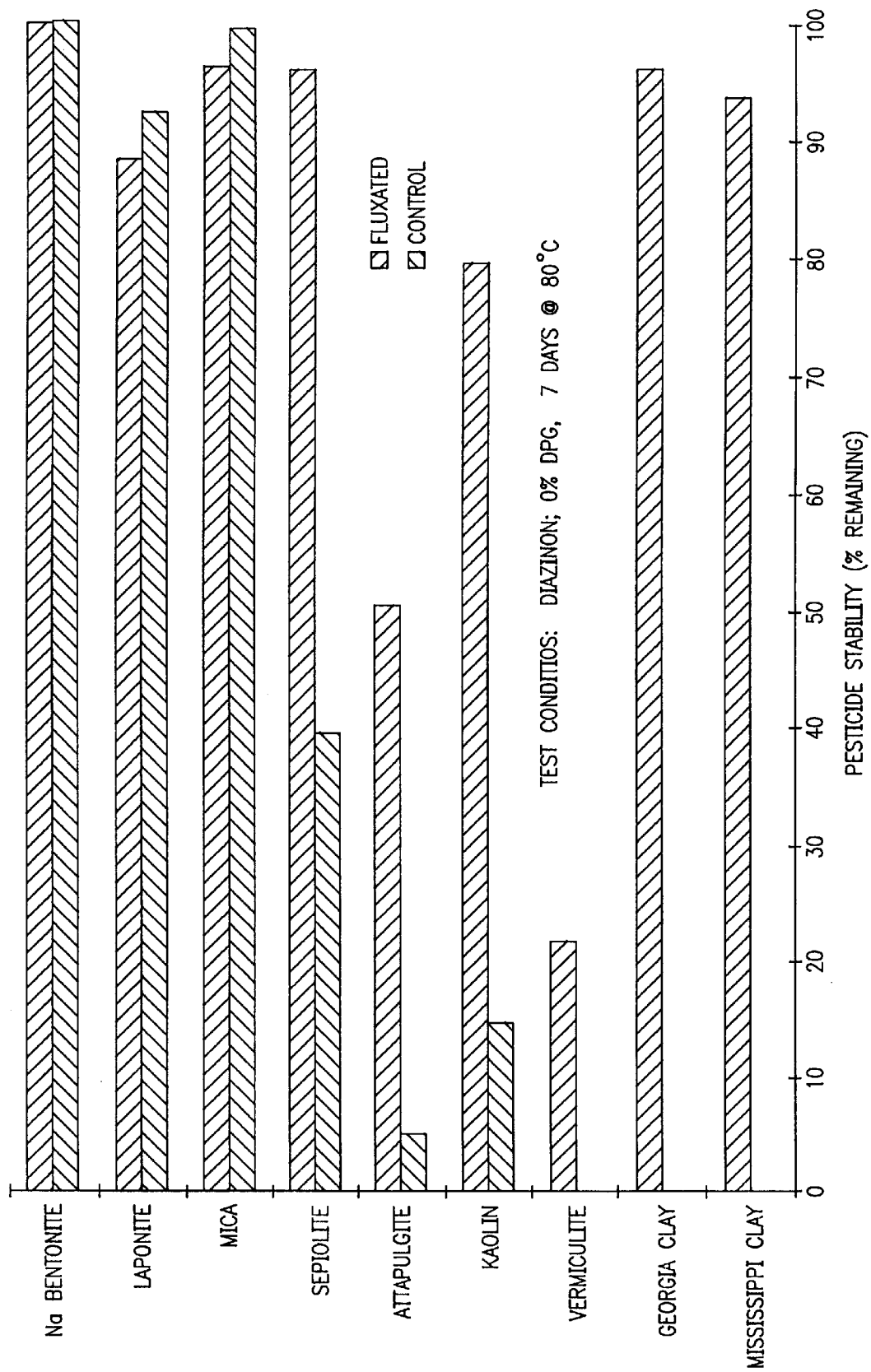
FIG. 17 is a histogram illustrating the accelerated stability results of Diazinon™ on selected fluxated clays.

The results of FIG. 17 indicate that only some of the clays subjected to the fluxation process exhibited enhanced stability characteristics as carriers for agricultural chemicals, such as pesticides, relative to their respective untreated controls. For instance, vermiculite, kaolin, attapulgite, and sepiolite clays show enhanced pesticide stability with fluxation, while sodium bentonite, laponite, and mica clays do not.

The pesticide stability characteristics of the remaining clays are improved to varying degrees by the present fluxation process. For example, the stability of Diazinon™ on fluxated sepiolite and fluxated kaolin clay is significantly improved relative to their controls. Attapulgite and vermiculite are also improved but less markedly so.

The surface acidities of the clays (listed in TABLE 14) were tested according to the Hammett Indicator Method, as described below. The treated clays were first ground to a particle size of about 200 mesh, U.S. Sieve Series. About 10 g of this ground sample was dried in an oven for about 1.5 hours at a temperature of about 105° C., then stored in a dessicator. A series of indicators (as described in TABLE 15) were prepared by weighing 0.05 g of indicator into a dry bottle then adding about 50 ml of dimethylene chloride. To determine the acidities of each clay, 10 portions of 0.5 g each per clay type were weighed into a set of 10 dry tared bottles.

Figure 18:
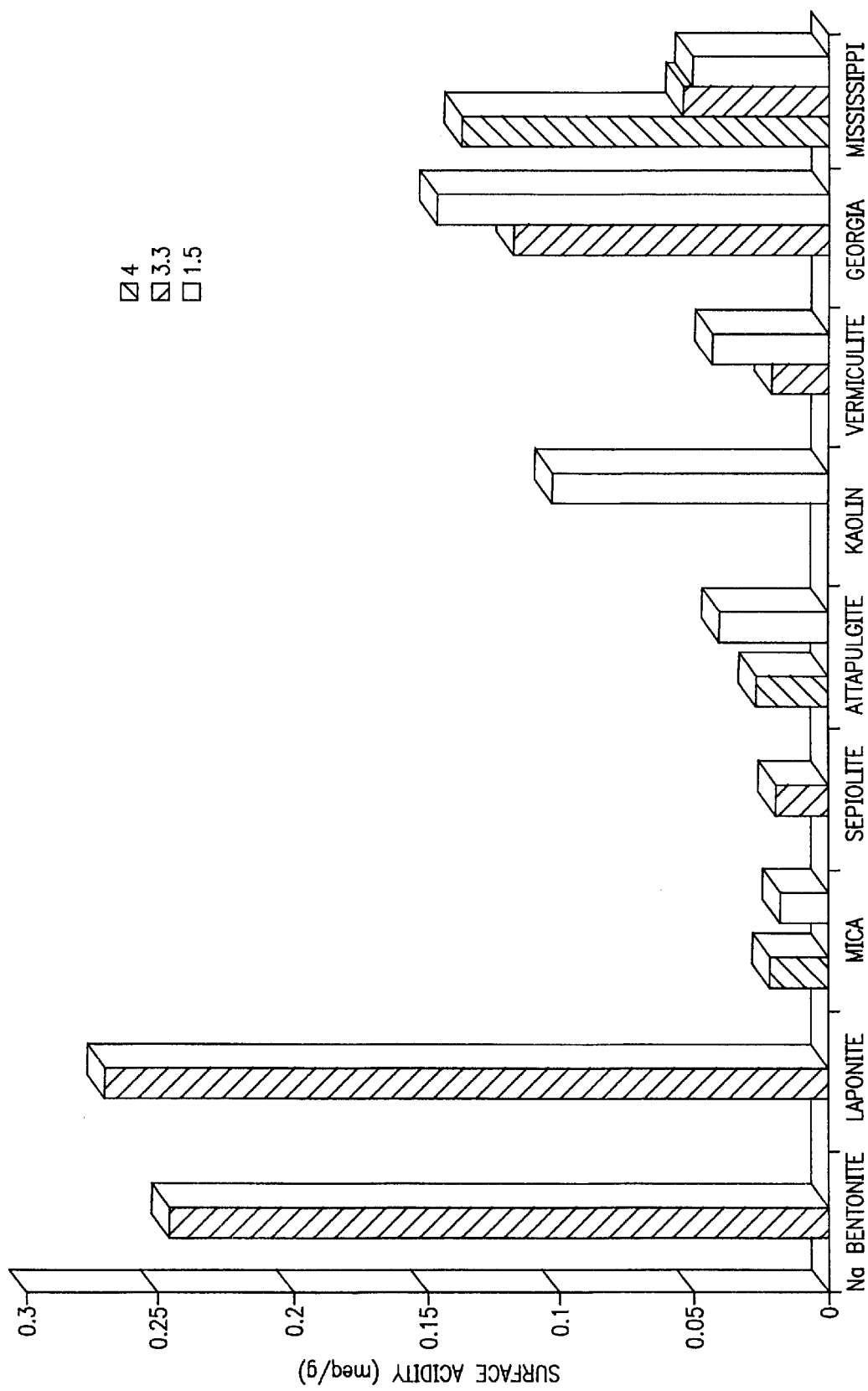
FIG. 18 is a histogram illustrating the surface acidity of selected raw clays according to acid site strength at pKa values of 1.5, 3.3, and 4.
Figure 19:
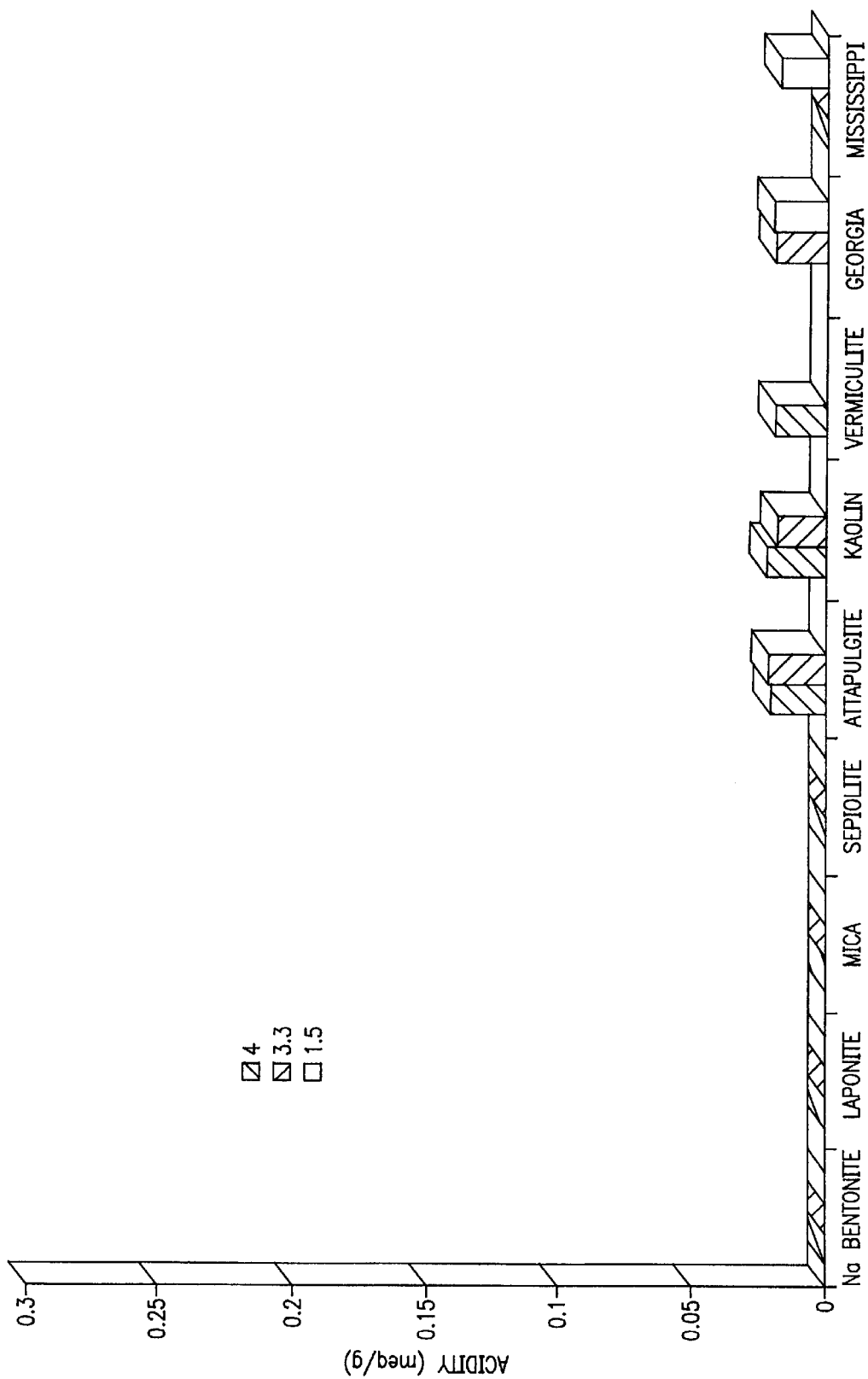
FIG. 19 is a histogram illustrating the surface acidity of selected fluxated clays according to acid site strength at pKa values of 1.5, 3.3, and 4.

About 10 ml of iso-octane was then added to each bottle. Next an increasing series of n-butylamine (0.2 ml, 0.4 ml, 0.6 ml, 0.8 ml, 1 ml, 1.4 ml, 1.8 ml, 2.2 ml, and 2.6 ml) were added to the clays. The bottles were capped and shaken overnight in an orbital shaker set at a speed of about 200 rpm. Next, for each set of 10 bottles, a test tube rack of 50 tubes was prepared. A subset of 5 tubes were filled with the shaken clay solution until each bottle of suspension had been pipetted into 5 tubes. Next, the chosen indicator (several drops) was added to the tube using a disposable pipet. Each clay sample was mixed with each indicator and allowed to react for about 45 minutes. The liquid remaining in the tube was decanted and the clay in the tube was allowed to air dry. The clay was then scraped out of the tube onto a white ceramic plate. The point where the color of the indicator changed was determined visually. The amount of acidity at the pKa of the indicator equals the amount of n-butylamine added per gram of clay minus the amount of acidity found at the pKa's lower than that of the indicator. The results for selected raw clays are illustrated in FIG. 18, and those of selected fluxated clays are illustrated in FIG. 19.

TABLE 14

Clay Types sodium bentonite (Na Bentonite) 16/40 mesh size, U.S. Sieve Series
laponite, powder, Southern Clay Products
mica, 50/200 mesh size, U.S. Sieve Series, King Minerals
sepiolite, 25/50 mesh size, U.S. Sieve Series, Floridin Co.
attapulgite, 18/40 mesh size, U.S. Sieve Series, Oil-Dri
kaolin, powder, Georgia Kaolin
vermiculite, 16/30 mesh size, U.S. Sieve Series, Strong-Line Products
Georgia (attapulgite/montmorillonite) 24/40 mesh size, U.S. Sieve Series, Oil-Dri
Mississippi (montmorillonite), 24/40 mesh size, U.S. Sieve Series, Oil-Dri The foregoing discussion and data are presented as illustrative and are not to be taken as limiting. Still other variations within the spirit and scope of the present invention are possible and will readily present themselves to those skilled in the art.

We claim:

1. A process for the manufacture of a substantially inert and dust-free absorbent suitable as a carrier for agricultural chemicals and comprising:
    a) combining a vitrifiable clay with an aqueous metal salt solution wherein the metal salt is sodium carbonate to form a metal salt impregnated clay; and
    b) heating the metal salt impregnated clay to a temperature in the range of about 800° F. to about 1500° F. for a time period sufficient to produce vitrified clay particles.

2. The process of claim 1 wherein the vitrifiable clay has a surface acidity above about 0.02 milliequivalents of n-butylamine per gram of clay and a pKa of about 1.5.

3. The process of claim 1 wherein the aqueous solution of the metal salt contains about 20% by weight of the salt in water.

4. The process of claim 1 wherein the aqueous solution of the metal salt is about 10% to about 30% by weight of the salt in water.

5. The process of claim 1 wherein the aqueous solution of the metal salt is applied to the clay at a level of about 5% by weight, based on the dry weight of the clay.

6. The process of claim 1 wherein the aqueous solution of the metal salt is applied to the clay at a level in the range of about 3% to about 7% by weight, based on the dry weight of the clay.

7. A process for the manufacture of a substantially inert and dust-free absorbent suitable as a carrier for agricultural chemicals and comprising:
    a) combining a vitrifiable clay with an aqueous solution of a metal salt wherein the metal salt is a member of the group consisting of calcium formate, magnesium chloride, and calcium chloride to form a metal salt impregnated clay; and
    b) heating the metal salt impregnated clay to a temperature in the range of about 800° F. to about 1500° F. for a time period sufficient to produce vitrified clay particles.

8. The process of claim 7 wherein the aqueous solution of the metal salt contains about 20% by weight of the salt in water.

9. The process of claim 7 wherein the aqueous solution of the metal salt is about 10% to about 30% by weight of the salt in water.

10. The process of claim 7 wherein the aqueous solution of the metal salt is applied to the clay at a level of about 5% by weight, based on the dry weight of the clay.

11. The process of claim 7 wherein the aqueous solution of the metal salt is applied to the clay at a level in the range of about 3% to about 7% by weight, based on the dry weight of the clay.

12. The process of claim 7 wherein the salt-impregnated clay is heated to a temperature in the range of about 900° F. to about 1350° F.

13. The process of claim 7 wherein the time period for heating the salt-impregnated clay is in the range of 2 to 3 hours.

14. The process of claim 7 wherein the vitrified clay is further treated with an organic deactivator for the vitrified clay.

15. The process of claim 14 wherein the organic deactivator is dipropylene glycol.

16. The process of claim 15 wherein the amount of dipropylene glycol applied to the clay is in the range of about 1% to about 4% by weight, based on the dry weight of the clay.

17. The process of claim 1 wherein the salt-impregnated clay is heated to a temperature in the range of about 900° F. to about 1350° F.

18. The process of claim 1 wherein the time period for heating the salt-impregnated clay is in the range of 2 to 3 hours.

19. The process of claim 1 wherein the clay is a kaolinite clay.

20. The process of claim 1 wherein the clay is an attapulgite/montmorillonite clay.

21. The process of claim 1 wherein the clay is a montmorillonite clay.

22. A particulate absorbent material comprising durable, substantially dust-free, vitrified clay granules prepared by the process of claim 1.

23. A process for the manufacture of a substantially inert and dust-free absorbent suitable as a carrier for agricultural chemicals and comprising:
    a) combining a vitrifiable clay with an aqueous solution of a metal salt wherein the anion of the metal salt is a member of the group consisting of a monoatomic anion, an oxygen-containing polyanion, and mixtures thereof to form a metal salt impregnated clay;

b) heating the metal salt impregnated clay to a temperature in the range of about 800° F. to about 1500° F. for a time period sufficient to produce vitrified clay particles; and c) treating the vitrified clay particles with an organic deactivator for the vitrified clay particles.

24. The process of claim 23 wherein the organic deactivator is dipropylene glycol.

25. The process of claim 24 wherein the amount of dipropylene glycol applied to the clay is in the range of about 1% to about 4% by weight, based on the dry weight of the clay.

26. A process for the manufacture of a substantially inert and dust-free absorbent suitable as a carrier for agricultural chemicals and comprising:

a) combining a hormite clay with an aqueous solution of a metal salt wherein the anion of the metal salt is a member of the group consisting of a monoatomic anion, an oxygen-containing polyanion, and mixtures thereof to form a metal salt impregnated hormite clay; and b) heating the metal salt impregnated hormite clay to a temperature in the range of about 800° F. to about 1500° F. for a time period sufficient to produce vitrified hormite clay particles.

27. The process of claim 26 wherein the aqueous solution of the metal salt contains about 20% by weight of the salt in water.

28. The process of claim 26 wherein the aqueous solution of the metal salt is about 10% to about 30% by weight of the salt in water.

29. The process of claim 26 wherein the aqueous solution of the metal salt is applied to the clay at a level of about 5% by weight, based on the dry weight of the clay.

30. The process of claim 26 wherein the aqueous solution of the metal salt is applied to the clay at a level in the range of about 3% to about 7% by weight, based on the dry weight of the clay.

31. The process of claim 26 wherein the metal salt is an alkali metal salt.

32. The process of claim 26 wherein the metal salt is an alkaline earth metal salt.

33. The process of claim 26 wherein the alkali metal salt is selected from the group consisting of sodium carbonate, sodium bicarbonate, sodium chloride, lithium chloride, potassium carbonate, potassium chloride, sodium metasilicate, and sodium orthosilicate.

34. The process of claim 26 wherein the alkaline metal salt is selected from the group consisting of calcium formate, magnesium chloride, and calcium chloride.

35. The process of claim 26 wherein the metal salt is thermally decomposable.

36. The process of claim 26 wherein the thermally decomposable metal salt is sodium carbonate.

37. The process of claim 26 wherein the vitrified clay is further treated with an organic deactivator for the vitrified hormite clay.

38. The process of claim 37 wherein the organic deactivator is dipropylene glycol.

39. The process of claim 38 wherein the amount of dipropylene glycol applied to the clay is in the range of about 1% to about 4% by weight, based on the dry weight of the clay.

* * * * *

UNITED STATES PATENT AND TRADEMARK OFFICE
CERTIFICATE OF CORRECTION

PATENT NO. : 6,020,282
DATED : February 1, 2000
INVENTOR(S) : Dennis R. Taylor et al.

It is certified that error appears in the above-identified patent and that said Letters Patent is hereby corrected as shown below:

Col. 7, in TABLE 1:
    1st column, under heading "Deactivator (5 wt.%)", line 3, "$NaHCO_2$" should be -- $NaHCO_3$ --.
Col. 8, in TABLE 2:
    1st column, under heading "Deactivator (5 wt.%)", line 3, "$NaHCO_2$" should be -- $NaHCO_3$ --.
Cols. 11-12, in TABLE 3-continued:
    1st column, under heading "Compound", line 4, "$Na_2CO_2$" should be -- $Na_2CO_3$ --.
Cols. 11-12, in TABLE 5:
    1st column, under heading "Flux Agent", line 22, "$Na_4SiO_3$" should be -- $Na_2SiO_3$ --.
Cols. 13-14, in TABLE 6:
    1st column, under heading "Flux Agent", line 24, "$Na_2SiO_2$" should be -- $Na_2SiO_3$ --.
Col. 17, line 31, "unaffect ed" should be -- unaffected --.

Signed and Sealed this

Twentieth Day of February, 2001

Attest:

NICHOLAS P. GODICI

Attesting Officer    Acting Director of the United States Patent and Trademark Office